US008429190B2

(12) United States Patent
Gutierrez

(10) Patent No.: US 8,429,190 B2
(45) Date of Patent: Apr. 23, 2013

(54) METHOD AND SYSTEM FOR GENERATING AND DISTRIBUTING ELECTRONIC COMMUNICATIONS

(75) Inventor: Christopher J. Gutierrez, Overland Park, KS (US)

(73) Assignee: Adknowledge, Inc., Kansas City, MO (US)

( * ) Notice: Subject to any disclaimer, the term of this patent is extended or adjusted under 35 U.S.C. 154(b) by 708 days.

(21) Appl. No.: 11/101,857

(22) Filed: Apr. 8, 2005

(65) Prior Publication Data

US 2006/0036608 A1 Feb. 16, 2006

Related U.S. Application Data

(63) Continuation-in-part of application No. 10/915,975, filed on Aug. 11, 2004.

(51) Int. Cl.
*G06F 17/30* (2006.01)

(52) U.S. Cl.
USPC .................................... 707/781; 707/999.009

(58) Field of Classification Search ........................ 707/9
See application file for complete search history.

(56) References Cited

U.S. PATENT DOCUMENTS

| | | | |
|---|---|---|---|
| 4,276,597 A | 6/1981 | Dissly | |
| 5,541,835 A | 7/1996 | Dextraze | |
| 5,608,621 A | 3/1997 | Caveney | |
| 5,701,451 A | 12/1997 | Rogers | |
| 5,717,923 A | 2/1998 | Dedrick | |
| 5,724,521 A | 3/1998 | Dedrick | |
| 5,751,956 A | 5/1998 | Kirsch | |
| 5,774,868 A | 6/1998 | Cragun | |
| 5,812,997 A | 9/1998 | Morimoto | |
| 5,826,269 A | 10/1998 | Hussey | |
| 5,918,014 A | 6/1999 | Robinson | |

(Continued)

FOREIGN PATENT DOCUMENTS

| | | |
|---|---|---|
| EP | 0 869 652 | 10/1998 |
| WO | 01/37123 | 5/2001 |
| WO | 2004051418 A2 | 6/2004 |

OTHER PUBLICATIONS

Weiguang, Shao, et al., "An Agent Architecture for Supporting Individualized Services in Internet Applications," Tools with Artificial Intelligence, 1998, Proceedings Tenth IEEE International Conference in Taiei, Taiwan Nov. 10-12, 1998, Piscatawa, NJ, US Nov. 10, 1998, p. 140-147.

(Continued)

*Primary Examiner* — Anteneh Girma
(74) *Attorney, Agent, or Firm* — Meunier Carlin & Curfman, LLC

(57) ABSTRACT

Content is provided to electronic mail, commonly known as e-mail, over a network, such as the Internet. This content is provided in accordance with keywords, typically organized in a hierarchy. The presently highest ranked keyword, that is active, is passed to various content servers, along the network, in response to a request, returned from the e-mail client of a recipient user. The keywords are managed, such that after a certain number of responses from the recipients of the electronic mails, to content in each e-mail generated from a particular keyword, use of that particular keyword is terminated, as the keyword is inactivated. Content is then delivered in accordance with another keyword, typically the next highest ranked keyword.

54 Claims, 16 Drawing Sheets

U.S. PATENT DOCUMENTS

| | | |
|---|---|---|
| 5,937,392 A | 8/1999 | Alberts |
| 5,963,910 A | 10/1999 | Ulwick |
| 5,974,398 A | 10/1999 | Hanson |
| 5,983,227 A | 11/1999 | Nazem et al. |
| 5,991,735 A | 11/1999 | Gerace |
| 6,006,197 A | 12/1999 | d'Eon |
| 6,009,407 A | 12/1999 | Garg |
| 6,026,368 A | 2/2000 | Brown |
| 6,049,777 A | 4/2000 | Sheena |
| 6,075,535 A | 6/2000 | Fitzhugh |
| 6,078,892 A | 6/2000 | Anderson |
| 6,115,691 A | 9/2000 | Ulwick |
| 6,128,624 A | 10/2000 | Papierniak |
| 6,134,532 A | 10/2000 | Lazarus |
| 6,144,944 A | 11/2000 | Kurtzman |
| 6,151,584 A | 11/2000 | Papierniak |
| 6,189,030 B1 | 2/2001 | Kirsch |
| 6,199,106 B1 | 3/2001 | Shaw |
| 6,205,432 B1 | 3/2001 | Gabbard et al. |
| 6,208,975 B1 | 3/2001 | Bull |
| 6,216,129 B1 | 4/2001 | Eldering |
| 6,236,977 B1 | 5/2001 | Verba |
| 6,298,356 B1 | 10/2001 | Jawahar et al. |
| 6,321,209 B1 | 11/2001 | Pasquali |
| 6,360,221 B1 | 3/2002 | Gough |
| 6,363,383 B1 | 3/2002 | Kindo |
| 6,411,961 B1 | 6/2002 | Chen |
| 6,415,294 B1 | 7/2002 | Niemi |
| 6,448,958 B1 | 9/2002 | Muta et al. |
| 6,449,635 B1 | 9/2002 | Tilden, Jr. et al. |
| 6,460,036 B1 | 10/2002 | Herz |
| 6,477,575 B1 | 11/2002 | Koeppel |
| 6,490,584 B2 | 12/2002 | Barrett et al. |
| 6,553,373 B2 | 4/2003 | Boguraev |
| 6,601,041 B1 | 7/2003 | Brown |
| 6,615,212 B1 | 9/2003 | Dutta et al. |
| 6,618,718 B1 | 9/2003 | Couch |
| 6,622,125 B1 | 9/2003 | Cragun |
| 6,654,748 B1 | 11/2003 | Rabung et al. |
| 6,662,215 B1 | 12/2003 | Moskowitz |
| 6,721,784 B1 | 4/2004 | Leonard |
| 6,778,989 B2 | 8/2004 | Bates |
| 6,801,945 B2 | 10/2004 | Lin |
| 6,823,320 B1 | 11/2004 | Rubin |
| 6,839,736 B1 | 1/2005 | Kajita et al. |
| 6,850,252 B1 | 2/2005 | Hoffberg |
| 6,868,395 B1 | 3/2005 | Szlam |
| 6,868,525 B1 | 3/2005 | Szabo |
| 6,876,974 B1 | 4/2005 | Marsh |
| 6,883,014 B1 | 4/2005 | McErlean |
| 6,892,238 B2 | 5/2005 | Lee |
| 6,904,450 B1 | 6/2005 | King |
| 6,912,571 B1 | 6/2005 | Serena |
| 6,915,271 B1 | 7/2005 | Meyer |
| 6,934,687 B1 | 8/2005 | Papierniak |
| 6,938,000 B2 | 8/2005 | Joseph |
| 6,938,050 B2 | 8/2005 | Le et al. |
| 6,944,611 B2 | 9/2005 | Flank et al. |
| 6,944,817 B1 | 9/2005 | Danneels |
| 6,954,731 B1 | 10/2005 | Montague |
| 6,959,306 B2 | 10/2005 | Nwabueze |
| 6,968,333 B2 | 11/2005 | Abbott et al. |
| 6,970,830 B1 | 11/2005 | Samra |
| 6,973,436 B1 | 12/2005 | Shkedi |
| 6,988,096 B2 | 1/2006 | Gupta et al. |
| 7,006,979 B1 | 2/2006 | Samra |
| 7,006,981 B2 | 2/2006 | Rose |
| 7,013,285 B1 | 3/2006 | Rebane |
| 7,047,318 B1 | 5/2006 | Svedloff |
| 7,050,990 B1 | 5/2006 | Chu |
| 7,080,030 B2 | 7/2006 | Eglen |
| 7,103,563 B1 | 9/2006 | Voisin et al. |
| 7,149,893 B1 | 12/2006 | Leonard |
| 7,299,409 B2 | 11/2007 | Joshi |
| 7,493,499 B1 * | 2/2009 | Deaver et al. .................. 713/193 |
| 7,580,980 B2 | 8/2009 | Kawashima |
| 7,599,852 B2 | 10/2009 | Bosarge |
| 7,647,387 B2 | 1/2010 | Bellare |
| 2001/0029465 A1 | 10/2001 | Strisower |
| 2001/0037242 A1 | 11/2001 | Bataillon |
| 2001/0044745 A1 | 11/2001 | Shaw |
| 2002/0010746 A1 | 1/2002 | Jilk et al. |
| 2002/0013785 A1 | 1/2002 | Miyazaki |
| 2002/0026360 A1 | 2/2002 | McGregor |
| 2002/0032602 A1 | 3/2002 | Lanzillo et al. |
| 2002/0035568 A1 | 3/2002 | Benthin |
| 2002/0065850 A1 | 5/2002 | Bandu |
| 2002/0083140 A1 | 6/2002 | Shin |
| 2002/0087631 A1 | 7/2002 | Sharma |
| 2002/0107931 A1 | 8/2002 | Singh et al. |
| 2002/0111863 A1 | 8/2002 | Landesmann |
| 2002/0112013 A1 | 8/2002 | Walsh |
| 2002/0116476 A1 | 8/2002 | Eyal |
| 2002/0120589 A1 | 8/2002 | Aoki |
| 2002/0129002 A1 | 9/2002 | Alberts |
| 2003/0004882 A1 | 1/2003 | Holler et al. |
| 2003/0005052 A1 | 1/2003 | Feuer |
| 2003/0033420 A1 | 2/2003 | Eyal |
| 2003/0037041 A1 | 2/2003 | Herz |
| 2003/0083937 A1 | 5/2003 | Hasegawa |
| 2003/0115099 A1 | 6/2003 | Burns et al. |
| 2003/0163370 A1 | 8/2003 | Chen |
| 2003/0171990 A1 | 9/2003 | Rao |
| 2003/0191689 A1 | 10/2003 | Bosarge |
| 2003/0195802 A1 | 10/2003 | Hensen |
| 2003/0233409 A1 | 12/2003 | Awada |
| 2004/0059712 A1 | 3/2004 | Dean |
| 2004/0059788 A1 | 3/2004 | Marcus |
| 2004/0098465 A1 | 5/2004 | Seo |
| 2004/0122730 A1 * | 6/2004 | Tucciarone et al. ............ 705/14 |
| 2004/0128293 A1 | 7/2004 | Maeda |
| 2004/0150673 A1 | 8/2004 | Dobronsky |
| 2004/0189699 A1 | 9/2004 | Dobronsky |
| 2004/0199657 A1 | 10/2004 | Eyal |
| 2004/0215479 A1 | 10/2004 | Dorsey |
| 2004/0225562 A1 | 11/2004 | Turner |
| 2004/0249709 A1 | 12/2004 | Donovan et al. |
| 2005/0005028 A1 | 1/2005 | Huang |
| 2005/0038861 A1 | 2/2005 | Lynn et al. |
| 2005/0076051 A1 | 4/2005 | Carobus |
| 2005/0108343 A1 | 5/2005 | Collet |
| 2005/0114198 A1 * | 5/2005 | Koningstein et al. ........... 705/10 |
| 2005/0114345 A1 | 5/2005 | Wesinger, Jr. |
| 2005/0198170 A1 | 9/2005 | LeMay |
| 2006/0026071 A1 | 2/2006 | Radwin |
| 2006/0026497 A1 | 2/2006 | Hienlein |
| 2006/0122883 A1 | 6/2006 | Lynn |
| 2006/0129629 A1 | 6/2006 | Kawashima |
| 2006/0242411 A1 | 10/2006 | Lin |
| 2008/0140608 A1 * | 6/2008 | Takahashi et al. ................ 707/2 |
| 2009/0132276 A1 | 5/2009 | Petera et al. |

OTHER PUBLICATIONS

Notice of Allowability for U.S. Appl. No. 12/647,749, dated Oct. 2, 2012, 14 pages.

Final Office Action for U.S. Appl. No. 10/915,975, dated Aug. 11, 2004, 30 pages.

Notice of Allowance for U.S. Appl. No. 11/294,188, dated Dec. 28, 2011, 16 pages.

Notice of Allowance for U.S. Appl. No. 11/294,188, dated Aug. 12, 2011, 20 pages.

Notice of Allowance for U.S. Appl. No. 11/294,188, dated Apr. 27, 2011, 30 pages.

Notice of Allowance for U.S. Appl. No. 11/294,188, dated Dec. 23, 2010, 18 pages.

Notice of Allowance for U.S. Appl. No. 11/294,188, dated Sep. 1, 2010, 19 pages.

Office Action for U.S. Appl. No. 11/294,188, dated Dec. 21, 2009, 61 pages.

Office Action for U.S. Appl. No. 12/647,749 dated Aug. 5, 2011, 20 pages.

Office Action for U.S. Appl. No. 12/647,749 dated Dec. 1, 2010, 16 pages.

Office Action for U.S. Appl. No. 10/915,975, dated Nov. 23, 2010, 19 pages.

Office Action for U.S. Appl. No. 10/915,975, dated Jun. 15, 2011, 20 pages.
Office Action for U.S. Appl. No. 11/294,188 dated May 21, 2009, 41 pages.
Office Action for U.S. Appl. No. 11/294,188 dated Aug. 15, 2008, 33 pages.
EP Search Report dated Mar. 13, 2006, 5 pages.
Office Action for U.S. Appl. No. 11/449,135 dated Jan. 7, 2011, 17 pages.
Office Action for U.S. Appl. No. 11/449,135 dated May 7, 2010, 15 pages.
Notice of Allowance for U.S. Appl. No. 11/449,135 dated Nov. 8, 2011, 25 pages.
Office Action for U.S. Appl. No. 10/915,975, dated Mar. 2, 2010, 14 pages.
Office Action for U.S. Appl. No. 10/915,975, dated Oct. 15, 2009, 15 pages.
Office Action for U.S. Appl. No. 10/915,975, dated Dec. 23, 2008, 12 pages.
Amendment and Response to Office Action for U.S. Appl. No. 10/915,975 dated Jun. 19, 2009, 22 pages.
Amendment and Response to Office Action for U.S. Appl. No. 10/915,975 dated Jan. 15, 2010, 26 pages.
Interview Summary for U.S. Appl. No. 10/915,975 dated Sep. 2, 2010, 30 pages.
Rivest, R., Memorandum, "The MD5 Message-Digest Algorithm", MIT Laboratory for Computer Science and RSA Data Security, Inc., Apr. 1992, retrieved from the internet at http://www.ietf.org/rfc/rfc1321.txt, 20 pages.
Blowfish (cipher), Wikipedia, the free encyclopedia, retrieved from the internet at http://en.widipedia.org/wiki/Blowfish_(cipher) on Jun. 6, 2006, 4 pages.
Office Action for U.S. Appl. No. 10/915,975, dated Feb. 24, 2012, 22 pages.

* cited by examiner

KEY 1
UNIQUE ID : user@abc.com
KEYWORD IDENTIFIER : KWI1
MAILING ID : 100001

KEY 2
UNIQUE ID : joe@xyz.com
KEYWORD IDENTIFIER : KWI1
MAILING ID : 100001

KEY 3
UNIQUE ID : user@abc.com
KEYWORD IDENTIFIER : KWI2
MAILING ID : 100002

KEY 4
UNIQUE ID : sam@pqr.com
KEYWORD IDENTIFIER : KWI3
MAILING ID : 100003

METHOD AND SYSTEM FOR GENERATING AND DISTRIBUTING ELECTRONIC COMMUNICATIONS

CROSS REFERENCES TO RELATED APPLICATIONS

This application is a continuation in part application of commonly owned U.S. patent application Ser. No. 10/915,975, entitled: Method and System for Generating Electronic Communications, filed Aug. 11, 2004. U.S. patent application Ser. No. 10/915,975 is incorporated by reference herein.

FIELD OF THE INVENTION

The present invention relates to content delivery over networks and components associated therewith. In particular, the present invention relates to methods and systems for delivering content through electronic mail, commonly known as e-mail, over a network, such as the Internet, based on predetermined numbers of responses from the recipients of the electronic mails.

BACKGROUND OF THE INVENTION

Electronic communications have dramatically changed the ways in which people communicate. Electronic mail, commonly referred to as e-mail, is a widely used form of electronic communication. E-mail is the exchange of computer-stored messages by telecommunication, over a network, such as the Internet. E-mail accounts for the largest percentage of total traffic on the Internet. E-mail usage is expected to increase exponentially in the next few years as increasing numbers of people have access to computers, and therefore, the World Wide Web (WWW).

E-mail communications are desirable, as they are current, usually in real time, and are non-intrusive. Conversely, a telephone call is intrusive, as it must be attended to at the moment it is received, and may interfere with the recipient's activities. The e-mail recipient may open the e-mail when desired, and may delete the e-mail without reading it.

E-mail distribution to individuals and organizations is quick and economical. Senders create recipient lists, that may include thousands of recipients. Recipient e-mail addresses can be added and deleted from the lists as desired. The e-mail is composed once and sent to multitudes of recipients, all of whom receive the e-mail instantaneously. The e-mail can be duplicated and sent to recipients from another recipient list, typically in the matter of minutes.

However, many e-mails that are sent are time sensitive, and become irrelevant, as they are not opened immediately, or at least close to the time that they were sent. Moreover, e-mails are static, as their content is in a final or fixed configuration prior to being sent. The content of these static e-mails can not be changed, so if opened after the desired time, they become irrelevant.

When used for advertising, the production of static e-mails, of fixed content prior to being sent, is problematic. This is because advertising campaigns are usually time-sensitive. If recipients do not open the e-mail within the requisite time, they do not benefit from the advertisement. This amounts to a waste of resources for both the sender and the recipient. Moreover, the recipient may view the advertiser as an annoyance to a point where they refuse to patronize the advertiser, the opposite of the result desired.

Other advertising campaigns on networks, such as the Internet, utilize key words or other identifiers. When a user returns a keyword or other identifier to a search engine, they receive listings. These listings are sometimes in a predetermined order, based on the party that controls the underlying listing paying the search engine or search provider a fee each time the listing appears and the user "clicks" on the listing, whereby the user's browser is directed to a web site corresponding to the clicked listing.

Users typically "click" on these top listings, whereby the web sites associated with these listings receive large numbers of hits. These numbers can be so large, as the browsers can not access the web sites corresponding to the listing, whereby a time out error occurs on the user's computer, as a result of the browser unsuccessfully accessing the web site. As a result, users may never access the target web site, whereby the listing and the payment therefor by the party associated with the listing was ineffective.

Additionally, e-mail based advertising campaigns have typically been limited by advertisers placing a finite number on the numbers of static e-mail that are sent to potential recipients. This is typically due to contractual limits, if a third party runs the campaign, or a decision to limit the amount of traffic to the advertiser's targeted web site. Excess traffic to a web site, to the point where it may not be manageable may result in the server or other devices supporting the web site to become non-functional or "crash".

SUMMARY OF THE INVENTION

The present invention overcomes the drawbacks of contemporary information distribution systems and methods, by distributing e-mail and other digital data in accordance with preset limits (amounts) or caps. The caps are predetermined, and once a certain number of responses to a particular e-mail have been received, by a user clicking on a link of a rendered e-mail and his browser being directed to a targeted web site, the keyword used in providing content that was clicked on in the rendered e-mail, is deactivated and a new or subsequent keyword is activated. This new or subsequent keyword will be used in rendering content to e-mails that are opened after the previous keyword became inactive.

This process can continue for as long as there are keywords to be used, after a maximum or cap number of responses for the previous keyword have been met. The e-mails sent include an identifier in the request(s) that accompany the sent e-mail. The requests returned from the e-mail client of the user include the identifier, that will be used in locating the presently active keyword for that identifier. Content will be provided to the client of the user in accordance with the presently active keyword.

The caps or limits for the keywords can be set based on numbers, and can also be set for certain periods of time, such as daily, weekly, monthly, etc. For example, these caps are typically associated with advertising campaigns, that provide e-mail content based on the presently active keyword.

By placing caps on particular keywords, the system of the invention can manage traffic to web sites associated with the capped keywords, allowing for control over traffic to the targeted web sites associated with the capped keywords. Placing caps or limitations on keywords, the advertising campaign or other information distribution process may employ a wide breadth of keywords, to allow users to a broad range of advertisers' or information providers' targeted web sites. Also, by limiting keywords and moving between different keywords, no single keyword is overused.

Moreover, caps or limitations on keywords, can be determined in accordance with a budget to coordinate with, for example, an advertising campaign or other time-delimited information distribution. The caps or limitations on a budget allow for rotation of keywords at desired time intervals. For example, this allows exposure to information providers or advertisers over time periods, for example, of days, weeks, months, etc. as opposed to single, one-time exposures, or large amounts of exposure over a short time period, as is typical with mass e-mailings. The desired time intervals are typically over a period of time, such as, for example, days, weeks, months, etc., to expose users to advertising campaigns or other time delimited information distribution. Accordingly, keywords and their associated caps or limits can be rotated, for example, on a per day, per week or per month basis. Also, the caps associated with each keyword may be a set amount per interval, such as, for example, per day, per week, or per month. This way, information distribution or an advertising campaign can stay within its budget and can last a certain period of time.

The system and method of the present invention also allow for the system operator to maximize revenue, by using many different keywords. Accordingly, a system operator can replace and position keywords with high per click revenues into a hierarchy where these keywords will be the active keywords, used in providing content to e-mails opened by users, who have been sent an e-mail from the system.

An embodiment of the invention is directed to method for managing keywords. The method includes, providing data to at least one electronic communication (for example, an electronic mail, or e-mail) in accordance with a first keyword, when the first keyword is active, and, receiving an indicator, that at least a portion of the data provided to the at least one electronic communication in accordance with the first keyword, has been responded to. It is then determined if the number of indicators received has reached a predetermined number; and, if the number of indicators received has reached the predetermined number, the first keyword is deactivated and a second keyword, typically a different keyword than the first keyword is activated, for providing data to at least one electronic communication.

Another embodiment of the invention is directed to another method for managing keywords. The method includes, providing data to a plurality of electronic communications in accordance with an active keyword, and receiving an indicator, that at least a portion of the data provided in accordance with the active keyword, in at least some of the plurality of electronic communications, has been responded to. It is then determined if the number of indicators received has reached a predetermined number, and if the number of indicators has reached the predetermined number, the active keyword is deactivated and another keyword is designated as the active keyword, for providing data to electronic communications.

Another embodiment of the invention is directed to a method for managing content provided to electronic communications. The method includes, electronically maintaining at least one database of a plurality of keywords, each of the keywords for use in providing content to electronic communications, and each keyword in the at least one database of keywords includes a predetermined number corresponding to a limit for responses to the content in the electronic communications provided to the electronic communications based on a keyword. A database of keyword identifiers, corresponding to at the at least one database of a plurality of keywords, and a database of responses to the content provided to the electronic communications in accordance with each of the keywords, is electronically maintained. The keywords are electronically controlled in the at least one database of a plurality of keywords. The control is typically performed by changing keywords when a predetermined number of responses, to the content of electronic communications provided in accordance with at least one keyword, has been received in the database of responses.

Another embodiment of the invention is directed to a method for managing keywords. The method includes, providing data to at least one electronic communication in accordance with a keyword, and receiving an indicator, that at least a portion of the data provided in accordance with the keyword, in the at least one electronic communication, has been responded to. It is then determined if the number of indicators received has reached a predetermined number; and, the keyword, for providing content to at least one electronic communication, is changed, if the number of indicators received has reached the predetermined number.

Another embodiment of the invention is directed to a system for managing keywords. The system includes first, second and third components. The first component is for providing data to at least one electronic communication in accordance with a first keyword, when the first keyword is active. The second component is for receiving an indicator, that at least a portion of the data provided to the at least one electronic communication in accordance with the first keyword, has been responded to. The third component is for, determining if the number of indicators received has reached a predetermined number; and, deactivating the first keyword and activating a second keyword for providing data to at least one electronic communication, if the number of indicators received has reached the predetermined number.

Another embodiment of the invention is directed to a computer usable storage medium having a computer program embodied thereon for causing a suitably programmed system to manage keywords by performing the following steps when such program is executed on the system. The steps include, providing data to at least one electronic communication in accordance with a first keyword, when the first keyword is active, and receiving an indicator, that at least a portion of the data provided to the at least one electronic communication in accordance with the first keyword, has been responded to. A determination is then made if the number of indicators received has reached a predetermined number; and the first keyword is deactivated and the second keyword is activated, for providing data to at least one electronic communication, if the number of indicators received has reached the predetermined number.

Another embodiment of the invention is directed to a system for managing content provided to electronic communications. The system includes at least one database of a plurality of keywords, each of the keywords for use in providing content to electronic communications, and each keyword in the at least one database of keywords includes a predetermined number corresponding to a limit for responses to the content in the electronic communications provided to the electronic communications based on a keyword. There is also a database of keyword identifiers, corresponding to at the at least one database of a plurality of keywords, and a database of responses to the content provided to the electronic communications in accordance with each of the keywords. A controller for controlling the keywords in the at least one database of a plurality of keywords is part of the system. The controller changes keywords, typically inactivating one keyword while activating another keyword, when a predetermined number of responses, to the content of electronic communications provided in accordance with at least one keyword, has been received in the database of responses.

Another embodiment of the invention is directed to another system for managing keywords. The system includes first, second, third and fourth components. The first component provides data to at least one electronic communication in accordance with a keyword. The second component is for receiving an indicator, that at least a portion of the data provided in accordance with the keyword, in the at least one electronic communication, has been responded to. The third component is for determining if the number of indicators received has reached a predetermined number. The fourth component is for changing the keyword for providing content to at least one electronic communication if the number of indicators received has reached the predetermined number.

Another embodiment of the invention is directed to a computer usable storage medium having a computer program embodied thereon for causing a suitably programmed system to manage keywords by performing the following steps when such program is executed on the system. The steps include, providing data to at least one electronic communication in accordance with a keyword, and receiving an indicator, that at least a portion of the data provided in accordance with the keyword, in the at least one electronic communication, has been responded to. The steps then include determining if the number of indicators received has reached a predetermined number, and, changing the keyword for providing content to at least one electronic communication if the number of indicators received has reached the predetermined number.

BRIEF DESCRIPTION OF DRAWINGS

Attention is now directed to the drawings, where like reference numerals or characters indicate corresponding or like components. In the drawings:

FIG. 6 is a diagram of a key cache in accordance with an embodiment of the invention;

FIG. 12 is a screen shot showing a web page accessed from a redirect uniform resource locator in accordance with an embodiment of the invention.

DETAILED DESCRIPTION OF THE DRAWINGS

The present invention is related to systems and methods for delivering content through electronic mail, commonly known as e-mail, over a network, such as the Internet. The content is provided in accordance with keywords, typically organized in a hierarchy. The presently highest ranked keyword is passed to various content servers, while it is the active keyword, along the network, in response to a request, returned from the e-mail client of a recipient user. The keywords are managed, such that after a certain number of responses from the recipients of the electronic mails, to content in each e-mail generated from a particular keyword, use of that particular keyword is terminated, as the keyword is deactivated. Content is then delivered in accordance with another keyword, now the active keyword, that is typically the next highest ranked keyword. This process can continue for as long as there are ranked keywords, or as long as a system is programmed for.

Throughout this document, numerous textual and graphical references are made to trademarks. These trademarks are the property of their respective owners, and are referenced only for explanation purposes herein.

Figure 1:
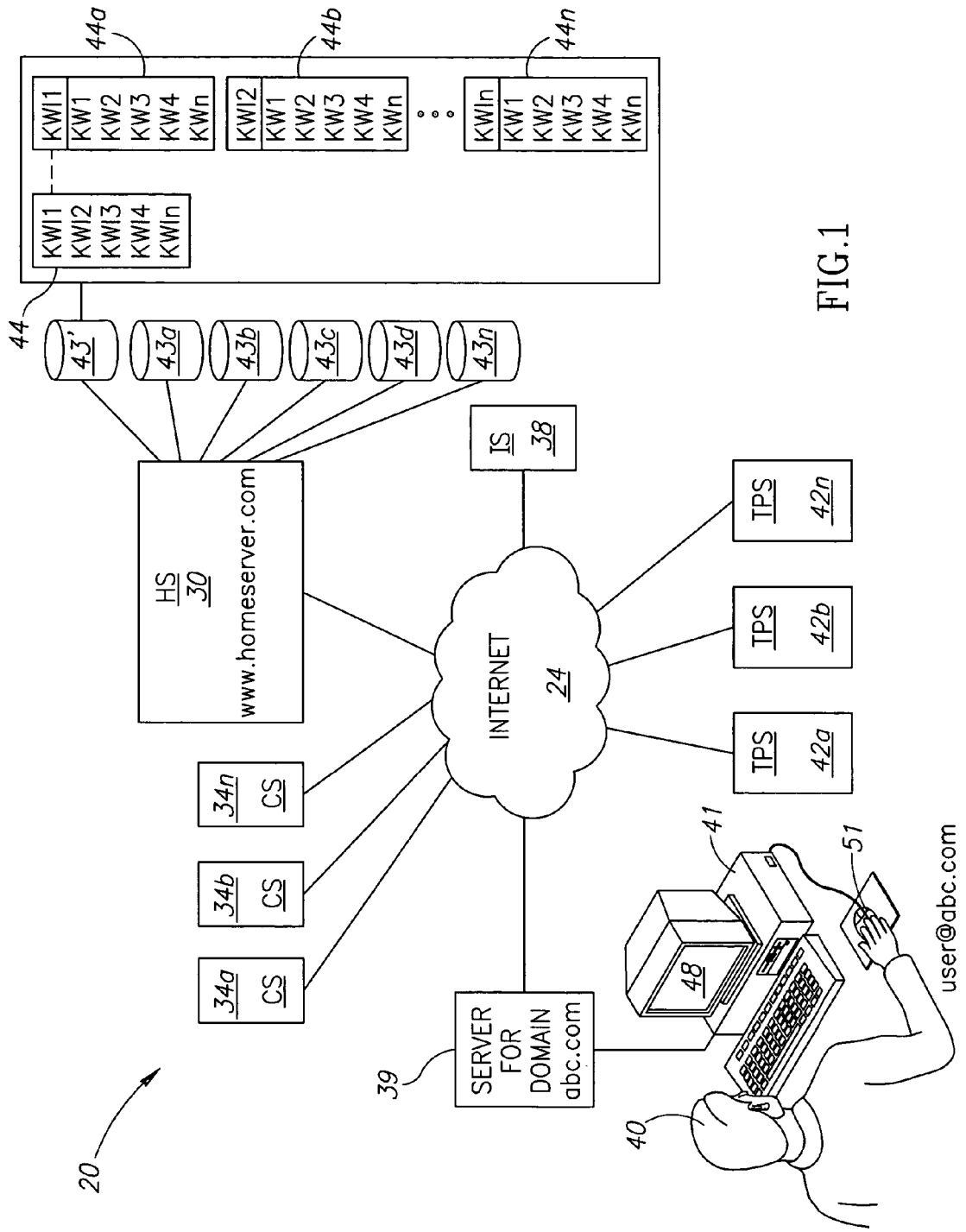
FIG. 1 is a diagram of an exemplary system on which an embodiment of the invention is performed.

FIG. 1 shows the present invention in an exemplary operation. The present invention employs a system 20, formed of various servers and server components, that are linked to a network, such as a wide area network (WAN), that may be, for example, the Internet 24.

There are, for example, at least three kinds of servers that form the system 20. These servers typically include a Home Server (HS) 30, one or more content servers (CS) 34a-34n, and an imaging server (IS) 38. These servers 30, 34a-34n and 38 are linked to the Internet 24, so as to be in communication with each other. The servers 30, 34a-34n and 38 include multiple components for performing the requisite functions as detailed below, and the components may be based in hardware, software, or combinations thereof. The servers 30, 34a-34n and 38 may also have internal storage media and/or be associated with external storage media.

The servers 30, 34a-34n, 38 of the system 20 are linked (either directly or indirectly) to an endless number of other servers and the like, via the Internet 24. Other servers, exemplary for describing the operation of the system 20, include a domain server 39 for the domain (for example, the domain "abc.com") of the user 40 (for example, whose e-mail address is user@abc.com), linked to the computer 41 of the user. Still other servers may include third party servers (TPS) 42a-42n, controlled by content providers and the like.

While various servers have been listed, this is exemplary only, as the present invention can be performed on an endless numbers of servers and associated components, that are in some way linked to a network, such as the Internet 24. Additionally, all of the aforementioned servers include components for accommodating various server functions, in hardware, software, or combinations thereof, and typically include storage media, either therein or associated therewith. Also in this document, the aforementioned servers, storage media, components can be linked to each other or to a network, such as the Internet 24, either directly or indirectly.

The Home Server (HS) 30 is of an architecture that includes components for handling electronic mail, to perform an electronic mail (e-mail) server functionality, including e-mail applications. The architecture also includes components for providing numerous additional server functions and operations, for example, comparison and matching functions, policy and/or rules processing, various search and other operational engines. The Home Server (HS) 30 includes various processors, including microprocessors, for performing the aforementioned server functions and operations and storage media, either internal or associated therewith, such as caches 43' and 43a-43n. The caches may include databases and other data structures for data storage and manipulation.

While caches 43' and 43a-43n and databases are shown, this is exemplary only, for explanation purposes. The Home Server (HS) 30 may be associated with additional caches, databases, as well as numerous other additional storage media, both internal and external thereto.

For example, the cache 43' may be divided into portions, or databases 44 and 44a-44n. The database 43' may be used to store keyword identifiers (KWI), shown in the database 44 as KWI1 to KWIn. Each keyword identifier (KWI1-KWIn) is linked to at least one database 44a-44n, that stores keywords (KW1-KWn). The keyword is a word or group of words, such as a phrase, or other suitable identifier for one or more data object(s).

The keywords (KW1-KWn) may be ranked in any order desired, and each database 44a-44n may include one or more keywords. In an embodiment of the invention detailed below and shown in FIGS. 13A and 13B, the keyword identifiers (KWIs) are for information distribution and in particular, advertising campaigns. Each campaign is identified by a number in the first database 544, with keywords for each campaign, in a second database 544a arranged in a hierarchical order and provided with a maximum number of clicks for each keyword, before the next highest keyword is used.

The Home Server (HS) 30 composes and sends e-mails to intended recipients (for example, e-mail clients hosted by a computer, workstation or other computing device, etc., associated with a user), over the network, typically a wide area network (WAN), such as the Internet. The home server (HS) 30 receives requests sent from the e-mail clients associated with the computer of a user. The e-mail clients may be, for example, America Online® (AOL®), Outlook®, Eudora®g, or other web-based clients. In this document, the client is an application that runs on a computer, workstation or the like and relies on a server to perform some operations, such as sending and receiving e-mail. Also, for explanation purposes, the Home Server (HS) 30 may have a uniform resource locator (URL) of, for example, www.homeserver.com. The process of sending the request from the home server (HS) 30 and returning the request to the home server (HS) 30, is further detailed below.

For example, the intended recipient or user 40 has a computer 41 (such as a multimedia personal computer with a Pentium® CPU, that employs a Windows® operating system), that uses an e-mail client. The computer 41 is linked to the Internet 24. This Home Server (HS) 30 typically employs a search engine, or links to one (in another server or the like via the Internet 24), in order to direct the designated keyword from the designated keyword identifier (KWI) (based on the data returned in the request from the e-mail client upon the e-mail being opened by the user) to the most suitable content server (CS) 34a-34n. While a single Home Server (HS) 30 is shown, the Home Server (HS) 30 may be formed of multiple servers and/or components, and may also be formed from still other servers with e-mail functionalities.

Content Servers (CS) 34a-34n (one or more) are also linked to the Internet 24. The content servers (CS) 34a-34n provide content, typically in text form, for the imaging server (IS) 38, typically through the Home Server (HS) 30, and typically, in response to a request from the Home Server (HS) 30, based on a designated keyword. These content servers (CS) 34a-34n may be, for example, Pay-Per-Click (PPC) servers of various content providers, such as internal providers, or external providers, for example, Overture Services, Inc. or Findwhat, Inc.

At least one imaging server (IS) 38 is linked to the Internet 24. The imaging server (IS) 38 functions to convert text (data in text format) from the content servers (CS) 34a-34n, as received through the Home Server (HS) 30, to an image (data in an image format). After conversion into an image, the image is typically sent back to the Home Server (HS) 30, to be placed into an e-mail opened by the user 40, as detailed below. Alternately, the imaging server (IS) 38 may send the image directly to the e-mail client associated with the user 40, over the Internet 24.

Figure 2:
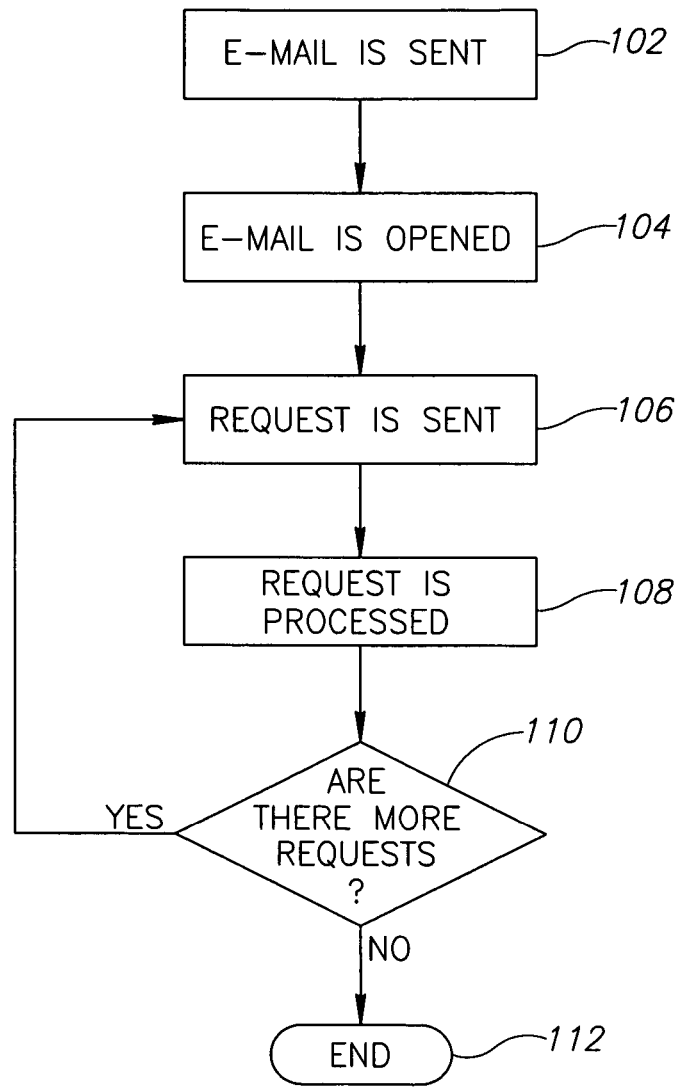
FIG. 2 is a flow diagram of a process for generating the content for an e-mail in accordance with an embodiment of the invention.

Turning also to FIG. 2, an exemplary implementation of a process in accordance with an embodiment of the present invention will now be described. FIG. 2 is a flow diagram of the process (method). The process of FIG. 2 may be the first phase of a larger process. For example, the first phase may involve rendering an e-mail to an e-mail client, while the second phase, shown in FIG. 10 and detailed below, is dependent on the first phase. The second phase directs the user to a target web site, via a link, that is activated once the user has clicked his mouse 51 on the dynamically rendered image or a portion thereof, of the opened e-mail, that is paired with the link.

Initially, the computer 41 of the user 40 includes an e-mail client (detailed above), installed thereon, that provides the user with a unique access and the ability to utilize one or more e-mail addresses. For example, the user 40 has an e-mail address, user®abc.com, through which he receives his e-mail from the domain server 39, that hosts the domain abc.com, of which the user 40 is a member. The computer 41 also includes a web browser, browsing software, application, or the like, to access web sites or web pages from various servers and the like, on the Internet 24. Some exemplary web browsers/web browsing software include, Internet Explorer®, from Microsoft, Redmond, Wash., and Netscape® Navigator®.

An e-mail is sent to the e-mail client associated with the computer 41 of the user 40, typically from the Home Server (HS) 30, at block 102. This initially or first sent e-mail, for explanation purposes, is referred to as the "sent e-mail".

The sent e-mail may be, for example, in Hypertext Markup Language (HTML), and may include one or more Hypertext Transport Protocol (HTTP) source requests. These HTTP source requests typically reference the Home Server (HS) 30.

The sent e-mail includes three main parts. These parts include, for example, a program for the body of the e-mail when it is opened, data identifying a keyword identifier (KWI), typically in a database of the Home Server (HS) 30, and one or more requests.

Figure 3:
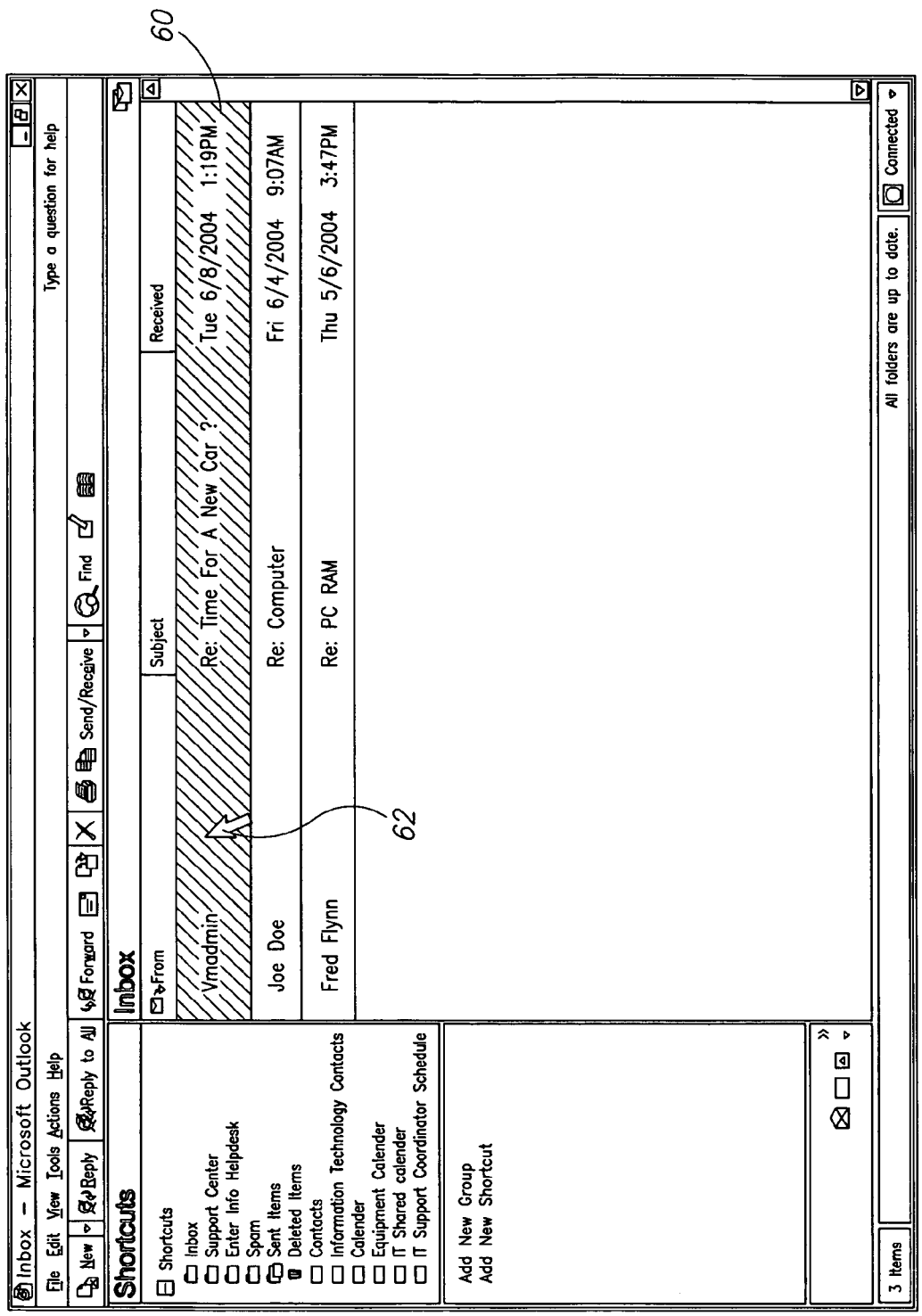
FIG. 3 is a screen shot showing e-mail communications in the mailbox of a recipient.

The sent e-mail includes a program that provides the body of the e-mail when the e-mail is opened. The program provides a template (FIG. 4), that forms the basic structure or framework for the image(s) of the sent and opened e-mail, and, zero or more HTTP Source requests for zero or more static images. The sent e-mail may also include HTML constructs and text, such as plain text, HTML headers, list constructs and the like. The sent e-mail, as received by the e-mail client, typically appears on the screen (monitor) 48 of the user's computer as a line of text 60 (shown as shaded for emphasis only) identifying the sender, subject and other information, as shown in FIG. 3.

The sent e-mail typically includes one or more requests. The total number of request(s) is represented by "N". A single request typically corresponds to a single image to be rendered (into the template of the e-mail image) when the e-mail is opened by the user 40 (as detailed below).

Each of the one or more requests in the e-mail may include data (or data elements) such as: a) a unique identifier (ID); b) at least one keyword identifier (KWI), or data corresponding to the at least one keyword identifier (KWI); c) a mailing identifier (ID); d) position data, represented herein as POS; and, e) a max number, corresponding to the maximum number of images (represented in this document by "N") that will be dynamically generated and rendered for this particular e-mail.

Each of the one or more requests in a sent e-mail typically includes all five of these data elements. However, if there is only a single request in a sent e-mail, position data is typically not included, because there is only one position for the dynamically generated text in the request (and the max number is 1).

The unique identifier, also known as a user identifier (ID), may be, for example, an e-mail address for the recipient of the sent e-mail, or any other data that guarantees uniqueness for the particular sent e-mail (and its corresponding returned request(s)). A unique identifier is attached to each particular user.

The keyword identifier (KWI) has been described above, and is linked to a database or other storage device, to retrieve the requisite keyword. It is this retrieved keyword that will be used to obtain the data objects that form the content for the dynamically generated portions of the e-mail. The specific keyword that is returned is based on rules, policies, or combinations thereof, programmed into the home server (HS) 30.

The mailing identifier (ID) is a sequence of characters indicative of the batch from which the particular e-mail was sent. For example, a mailing identifier may be a sequence of numbers.

The position data is data indicative of the location in the template where the image (that is generated dynamically) corresponding to that particular request is to be rendered (placed or located). For example, if the e-mail to be rendered has two locations where two separate requests are to be rendered, the first location will be represented by POS=1, while the second location will be represented by POS=2.

The max number is typically equal to N. This is because each request typically results in a single image being dynamically generated to a corresponding position in the template.

When e-mail (the sent e-mail) is downloaded by the e-mail client of the user 40, the e-mail client opens a connection or "pipe" to the Home Server (HS) 30. The e-mail client associated with the user 40, pulls data from the Home Server (HS) 30, and may pull data asynchronously. The data pulled from the Home Server (HS) 30 includes data required to display the resultant dynamically generated text (in the form of images), for example, a template 150, as shown in FIG. 4, and the single or multiple requests.

At block 104, the user 40 opens this e-mail, typically by clicking the mouse 51 (of the computer 41), as shown by the arrow 62, anywhere along the line 60, that represents the sent e-mail as received in the user's mail box, as shown in FIG. 3. This opening, for purposes of explanation herein, occurs at a time indicated as $t_1$ (a time once the e-mail client has received the e-mail from the home server (HS) 30). Pulling of data from the Home Server (HS) 30 by the e-mail client is continuous, as long as requests are being processed, as described below.

Figure 4:
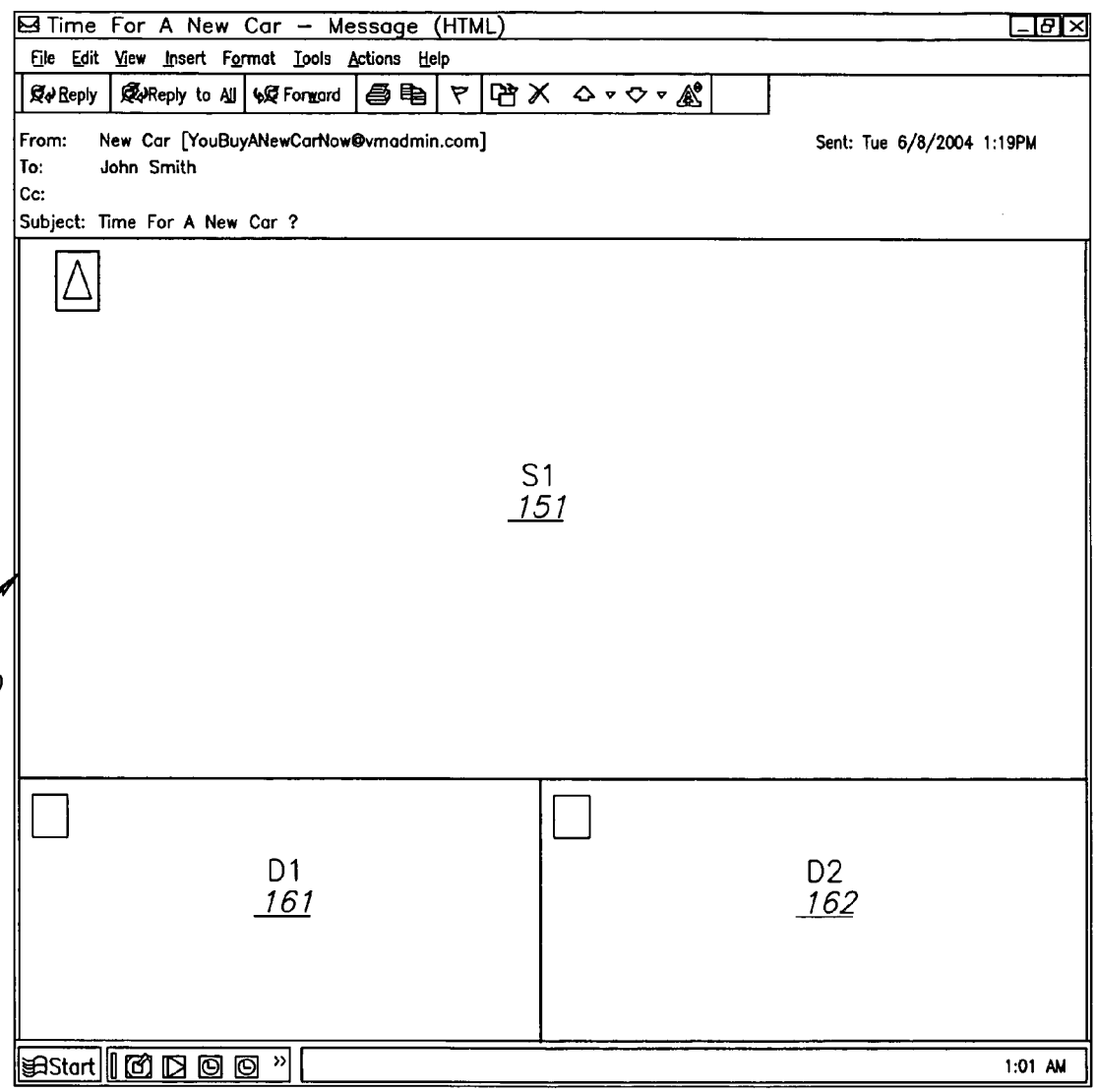
FIG. 4 is a screen shot of an exemplary template in accordance with an embodiment of the invention.

Turning to FIG. 4, an exemplary template 150, that forms part of the body of the opened e-mail, is built out in three sections 151, 161 and 162. A first section S I 151 is designed to receive a static image, having content that is fixed prior to the time the e-mail was sent. The image for the section S1 151 is typically pulled from the Home Server (HS) 30 along with the template 150, when the e-mail is opened, as detailed above.

Sections D1 161 and D2 162, for example, are designed to receive the dynamically generated images, that are generated and assembled when and only if the e-mail is opened. Section D1 161, for example, is the first position for the dynamically generated images, and as such, receives the image from the first listing of the listing text (described below), resulting from the first request being processed; this first request, for example, has position data (POS=1) corresponding to this first position. Similarly, Section D2 162, for example, is the second position for the dynamically generated images, and as such, receives the image from the second listing of the listing text (described below), resulting from the second request being processed; this second request, for example, has position data (POS=2) corresponding to this second position.

With the connection or pipe now opened, a request, known as the "sent back request", based on the request in the sent e-mail, is sent from the e-mail client (associated with the computer 41 of the user 40) to the home server (HS) 30, at block 106. The sent back request includes portions of, and typically all of, the request of the sent e-mail. For example, each sent back request is typically formed from data or data elements including: a) a unique identifier, b) a keyword identifier (KWI), c) a mailing identifier, d) position data, and e) a max number.

The Home Server (HS) 30 receives each request, one at a time, for processing, at block 108. The sub process associated with processing the request are described in detail below, with respect to FIG. 5. The result of each processed request includes obtaining a keyword from a cache 43' followed by obtaining text from content servers (CS) 34a-34n based on the keyword and max number associated with the request. The content servers 34a-34n assemble text in an order in accordance with the rules and policies of each content server (CS) 34a-34n. For example, content servers may select and rank their content on a Pay Per Click (PPC) basis, where listings of are arranged in accordance with bid amounts that a web site promoter will pay to the owner of the content server, should the user click on a link that will direct the user's browser to a target web site, associated with the web site provider who bided for the requisite position.

Text (text data) is obtained from the requisite content server (CS) 34a-34n, as the home server (HS) 30 pulls the requisite number of listings, corresponding to N requests, from the content server (CS) 34a-34n. The pulled listings are placed into a cache 43a, associated with the home server (HS) 30.

The home server (HS) 30 sends this data (e.g., in text form) to the imaging server (IS) 38, that generates an image(s) corresponding to the received data (text data). This generated image is returned to the e-mail client of the user, for placement into the template 150, in the position corresponding to the number of the request. For example, the first request would be placed at position D1 (corresponding to POS=1) in the e-mail template 150, while the text corresponding to the second request would be placed into the template 150 at the second position D2 (corresponding to POS=2). The aforementioned data transfers may occur over previously opened and/or existing connections or pipes in the Internet 24 (network).

In the case of an HTTP request, the generated image is sent back to the e-mail client associated with the user 40, through the open connection or pipe. Alternately, for non-HTTP requests, the Home Server (HS) 30 could generate one or more new open connections or pipes, that are different than the previously existing connections or pipes over which the request was sent to the Home Server (HS) 30. It is over these new connection(s) or pipe(s) that the image, from the imaging server (IS) 38 may be transferred from the Home Server (HS) 30 to the e-mail client associated with the user 40, over the Internet 24.

The process moves to block 110, where it is then determined, typically in the Home Server (HS) 30, if there are more requests to be processed. If there are not any more requests to be processed, the process ends at block 112.

If there are more requests to be processed, the process returns to block 106. The next request of the total number or "N" requests is sent, and the process continues from block 106, as described above. The process will repeat until all N requests have been processed, and once all N requests have been processed, the process ends at block 112.

Figure 5:
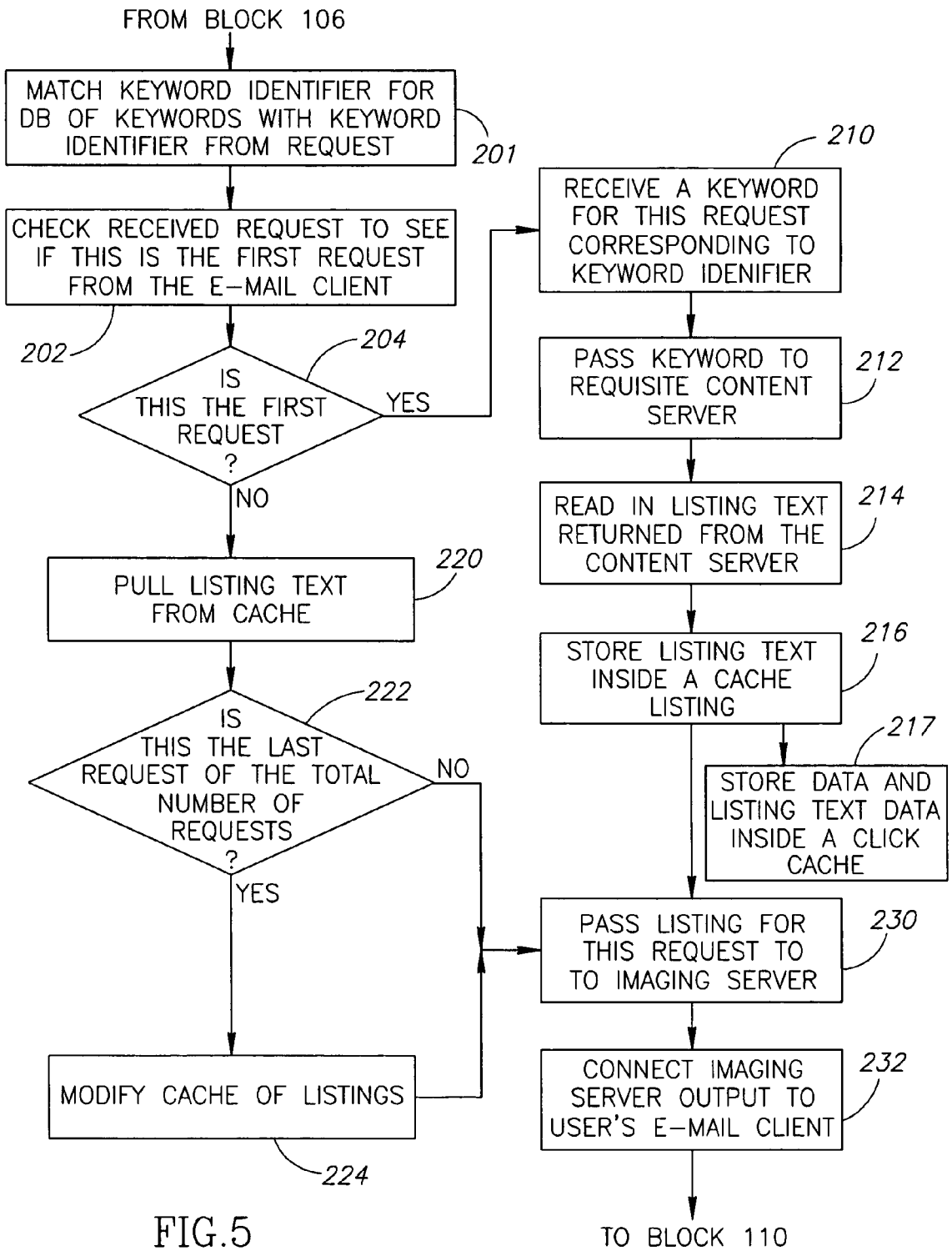
FIG. 5 is a flow diagram of the request processing sub process of FIG. 2.

Attention is now directed to FIG. 5, that shows a flow diagram of block 108 of FIG. 2, detailing the processing of requests. In this process, requests are processed one at a time, typically on a "first in" basis.

Initially, the Home Server (HS) 30, upon receiving the request, at block 201, matches the keyword identifier in the "sent back" request with a keyword identifier (KWI), for example keyword identifiers KWI1 to KWIn, in the database 44 of the cache or database 43'. Once this match is made, the request is analyzed to determine if it is the first request from the e-mail client of the user, at block 202. It is then determined if this request is the first request, at block 204.

In the subprocess of block 204, the unique identifier, for example, the mailing address of the user, the keyword identifier, and the mailing identifier, are grouped to define a key at the home server (HS) 30. The key could also be defined in other ways, depending on the rules and policies of the home server (HS) 30. The now created key is queried against all other keys in the cache 43a, known as the key cache, associated with the home server (HS) 30. The definition of what is a match for keys is in accordance with rules and policies programmed into the home server (HS) 30.

If a matching key is not found in the key cache 43a, this is the first request, and the process moves to block 210. Accordingly, the key cache 43a is empty of this particular key, and this key is now stored in the key cache 43a, as shown for example, in FIG. 6. All of the requests from each sent e-mail have the same key. Alternately, if a matching key is found, the process moves to block 220.

As shown in FIG. 6, keys, indicated by KEY 1 to KEY 4 are unique to each opened e-mail for a particular recipient (user), in accordance with the time each e-mail was opened. For example, the user with a unique identifier (ID) of user@abc.com has opened two different e-mails, whereby he will receive the content corresponding to each specific e-mail, based on the keyword identifiers. Similarly, in FIG. 6, the user "joe@xyz.com" may receive different content than the user "user@abc.com" even though their requests were based on the same keyword "NEW CARS", keyword identifier, and they received their e-mail in the same batch, at approximately the same time, as indicated by the same mailing identifier, but opened these e-mails at different times.

If the request being processed is the first request, the process is at block 210. The database of keyword identifiers 44 is isolated, that in turn isolates the database for the particular keyword identifier (KWI), for example, database 44a. This database is then queried, in accordance with rules and policies of the system, and a keyword is isolated (selected). For example, in an embodiment of the invention, the currently highest ranked keyword is isolated (selected). The keyword in the request is isolated. The keyword is typically in the form of alphanumeric data, and may be an actual keyword, or a keyword group identifier. The keyword is translated into data, recognizable and usable by the requisite content servers (CS) 34a-34n.

An exemplary application of this keyword selection process based on a hierarchy of keywords is detailed below and shown in FIGS. 13A and 13B.

The process now moves to block 212, where the keyword (data corresponding to the keyword) is read, and in accordance with the reading, it is passed to a designated content server (CS) 34a-34n, over the Internet 24. The passing to the specific content server is typically in accordance with one or more rules, preprogrammed into the Home Server (HS) 30 or by a policy processor associated with the Home Server (HS) 30. The policies and/or rules are typically time-sensitive, to be applicable in real-time. For example, the keyword may be such, that once read, the preprogrammed rules will be applied. The keyword data will be passed to a specific content server, such as content server (CS) 34a, over Internet 24.

Alternately, the keyword can be passed to a content server (CS) 34a-34n that performs a search engine function and generates a listing text, typically of N listings. N corresponds to the number of requests in the sent e-mail. Also, the number of requests "N" is stored in a request cache, along with a key. A request cache may be, for example, the cache 43b.

The content server (CS) 34a-34n, for example, content server (CS) 34a, that received the passed keyword (keyword data), is queried for acceptance of the keyword (keyword data), and returns a listing text, typically of N listings, to the Home Server (HS) 30. This listing text is read into the Home Server (HS) 30, at block 214. Data exchanges, between the Home Server (HS) 30 and the content server (CS) 34a (representative of all content servers (CS) 34a-34n), are typically accomplished via Extensible Markup Language (XML).

The listing text, that is returned to the Home Server (HS) 30 from the content server (CS) 34a, is assigned a particular key, corresponding to the new key created in the key cache 43a (as a result of a matching key not being found), and includes the top "N" results, in the form of N listings. N is the total number of requests in the originally sent e-mail, as detailed above. Each listing of the listing text typically includes a title or headline for the content (e.g., the advertisement) to be returned to the e-mail client of the user 40, at least one target uniform resource locator (URL) for one or more servers, such as third party servers (TPS) 42a-42n, and data for the body of the content to be returned. The data for the body of the content to be returned includes data in text form and position data (POS), indicating the location for the data in text form in the template. The aforementioned portions of the listing text can be parsed, in accordance with the process being performed thereon.

The listing text is then stored in a cache, for example, the listing cache 43c, at block 216. The key assigned to the listing text, upon its being stored in the listing cache 43c, is linked to its corresponding key, typically in another cache, such as the key cache 43a.

Figure 7:
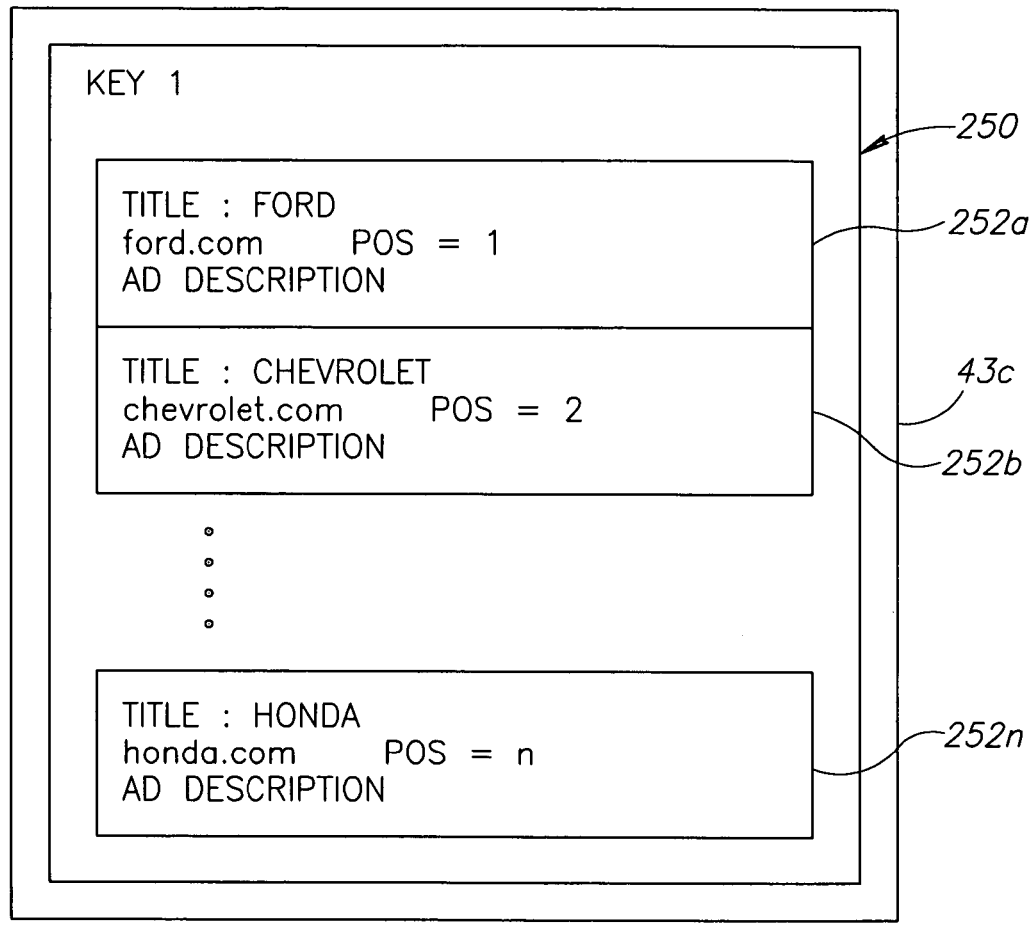
FIG. 7 is a diagram of a listing cache in accordance with an embodiment of the invention.

FIG. 7 shows an exemplary listing cache 43c, where a listing text 250 is stored therein. The listing text 250 includes a key, for example, KEY 1, formed of the unique identifier (ID), for example, user@abc.com, the keyword identifier (KWI), for example, KWI1, and, the mailing identifier (ID), for example, 100001, as shown in FIG. 6 and detailed above, and N listings 252a-252n. Within each listing 252a-252n is, for example, a title for a web site associated with the listing (for example, in listing 252a, the title is FORD), a URL for the web site associated with the listing (for example, in listing 252a, the URL is www.ford.com), position data (POS=1 or POS=2) indicating the location in the template where the image with the link to the web site associated with the listing (for example, in listing 252a, the position data is, POS=1), and data for the body of the content to be returned is referenced as "AD DESCRIPTION". The AD DESCRIPTION is the text to be sent to the imaging server (IS) 38 with the TITLE, to be converted into the requisite image, for placement into the template of the opened e-mail at the requisite position. The listings 252a-252n are typically placed into the listing text in an order of priority, here, for example, top to bottom or 252a, 252b, to 252n. Additionally, by storing the listing text in the cache 43c with a unique key, a specific user will receive listings intended for him at the time he opened the e-mail.

Accordingly, processing of the first request will result in the delivery of the first listing 252a in the form of an image, to the template of the opened e-mail at a position determined by the position data in the first request (for example, at a first position as the position data is POS=1). Similarly, processing of the second request will result in the delivery of the second listing 252b in the form of an image, to the template of the opened e-mail at a position determined by the position data in the second request (for example, at a second position as the position data is POS=2). Processing of the requests until the last or Nth request, results in delivery of the nth listing 252n to the Nth position in the template of the opened e-mail mail, in accordance with the position data, POS=n (as detailed below).

Figure 8:
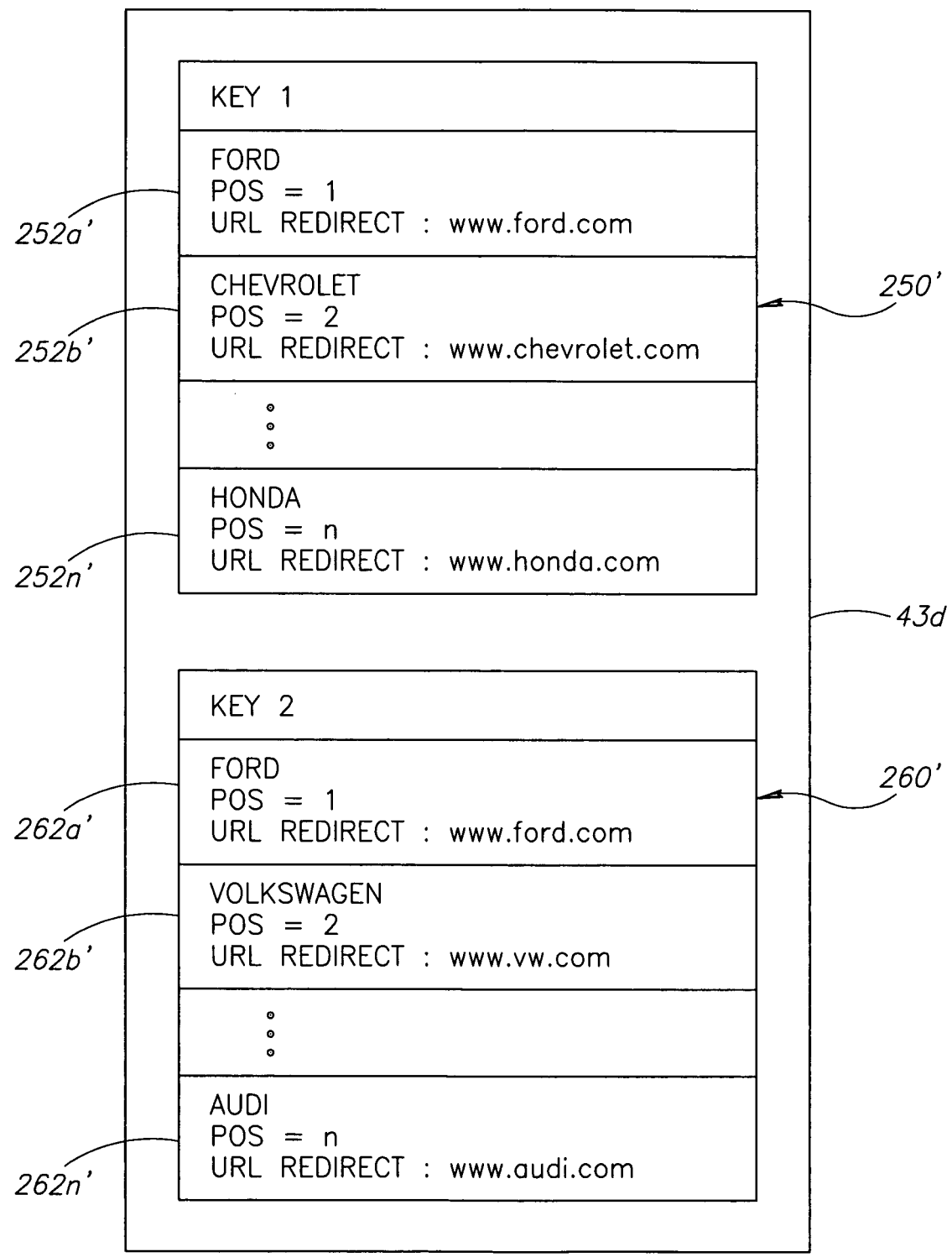
FIG. 8 is a diagram of a click cache in accordance with an embodiment of the invention.

Portions of the listing text are also stored in another cache, for example, a click cache 43d, at block 217. FIG. 8 shows an exemplary click cache 43d, where a listing text 250', corresponding to the listing text 250 of the listing cache 43c, is stored in the click cache 43d. The listing text 250' includes a key, identical to the corresponding key in the key cache 43a, as well as listings 252a'-252n'. Each listing 252a'-252n' corresponds to the listings 252a-252n of the listing text 250. Within each listing 252a'-252n' is, for example, a title for a web site associated with the listing (for example, FORD in the listing 252a'), a Redirect URL for the target web site associated with the listing (for example, www.ford.com, in the listing 252a'), and Position Data indicating the location for the resultant image produced from the listing in the template. For example, position data in the listing 252a' is represented as POS=1.

Remaining in FIG. 8, there is also a second listing text 260', to illustrate the click cache 43d, and the relationship of the caches 43a-43n. This second listing text 260' corresponds to KEY 2 in the key cache 43a (FIG. 6) and includes listings 262a'-262n' obtained at a different time than the listings corresponding to KEY 1, even though the keyword identifier KWI I and mailing identifier (e.g., 100001) for both KEY 1 and KEY 2 are the same. The listings 262a'-262n' result from the e-mail recipient joe@xyz.com opening his e-mail at a different time then the e-mail recipient user@abc.com, for different listings were provided at the time the Home Server (HS) 30 obtained the requisite content (for delivery to the respectively opened e-mails).

From block 216, the process moves to block 230, where the listing corresponding to the request number, and accordingly, the position data, is passed from the listing cache 43c of the Home Server (HS) 30 to the imaging server (IS) 38, over the Internet 24.

The imaging server (IS) 38 receives the listing in a text format and converts it into an image (or images). The image (or images) are sent to the user's e-mail client, via the Home Server (HS) 30, at block 232. The image(s) for the listing are rendered to the template in the position corresponding to the position data for the listing. The rendered image is typically paired with one or more links within the template, and, for example, at least one link within each image. The links are planted in the template in such a way that makes the image, or a portion thereof, clickable (activatable by a mouse click). The link includes an underlying URL for the Home Server (HS) 30 in a string with a unique identifier, keyword identifier (KWI), mailing identifier and position data. An example string may be as follows:

http://www.homeserver.com/"uniqueidentifier"&" keywordidentifier"&"mailingidentifier"&" positiondata"

The process then moves to block 110 of FIG. 2, to process the subsequent requests. Accordingly, the next request is sent to the home server (HS) 30, at block 106, for processing at block 108. The process returns to block 201 followed by block 202, and returns to block 204.

At block 204, if the received request is not the first request (or "sent back" request) sent from the e-mail client, the process moves to block 220. The request is identified as a subsequent request, as the unique identifier and keyword identifier (KWI) from the subsequent sent back request define a key, that will match with a key in the key cache 43a. The now matched key in the key cache 43a, is then used to identify the corresponding listing in the listing cache 43c, and pull (retrieve) the requisite listing text corresponding to the particular request.

The process moves to block 222, where it is then determined if this request, from which the listing text was pulled from the listing cache 43c, is the last request of the total number of requests. This is accomplished by the following sub process.

Initially, in the e-mail sent to the e-mail client (the "sent e-mail"), the number of requests (N) in the e-mail, in particular the position data of the e-mail, has been stored in a cache, for example, the request cache 43b. The position data is associated with a key for each sent e-mail, as stored in the request cache 43b. The number of requests needing to be serviced for each sent e-mail corresponds to the number of listings returned from the requisite content server (CS) 34a-34n, for example the content server (CS) 34a. For the first request serviced, a reference counter in the Home Server (HS) 30 has been decremented by one (for example, N-1). For each subsequent request that is serviced, the reference counter is again decremented by one. Decrementing continues, until the reference counter reaches zero (for example, N=0), when the last request has been processed.

Accordingly, in block 222, if the request is not the last request, the reference counter has a value of greater than zero (for example, N>0). The process moves to block 230.

In block 230, the next listing of the listing text (in text form) corresponding to the specific request, is pulled from the listing cache 43c, and is passed from the Home Server (HS) 30 to the imaging server (IS) 38. The process then moves to block 232, as detailed above.

However, if at block 222, the request is the last request, the reference counter has been decremented to have a value of zero (N=0). The process moves to block 224. The listing text in the listing cache 43c is modified.

Modification typically occurs after the last request of the total number of requests (from block 104) has been received and processed. Modification of the listing cache 43c of listings therein typically involves deleting the listing text from the listing cache 43c.

This subprocess is typically timed, such that once the final listing from the listing cache 43c for this last request has been passed to the imaging server (IS) 38, from the Home Server (HS) 30, at block 230, the listing text is modified in the listing cache 43c. The modification typically includes deleting the listing text from the listing cache 43c in a time period, for example, approximately three hours from the time the first request of the total number of requests or N requests was processed.

With the process now at block 230, the final listing from the listing text is pulled from the listing cache 43c, in response to this last request, and is passed to the imaging server (IS) 38, as detailed above. Once the listing (in text form) has been passed to the imaging server (IS) 38, the process moves to block 232, and back to block 110 (FIG. 2), as detailed above. Since the last request (for example, the Nth request) has been processed, in FIG. 2, the process moves to block 112, where the entire content for the e-mail has now been rendered to the e-mail client of the user 40, for placement into the now-opened e-mail.

Figure 9A:
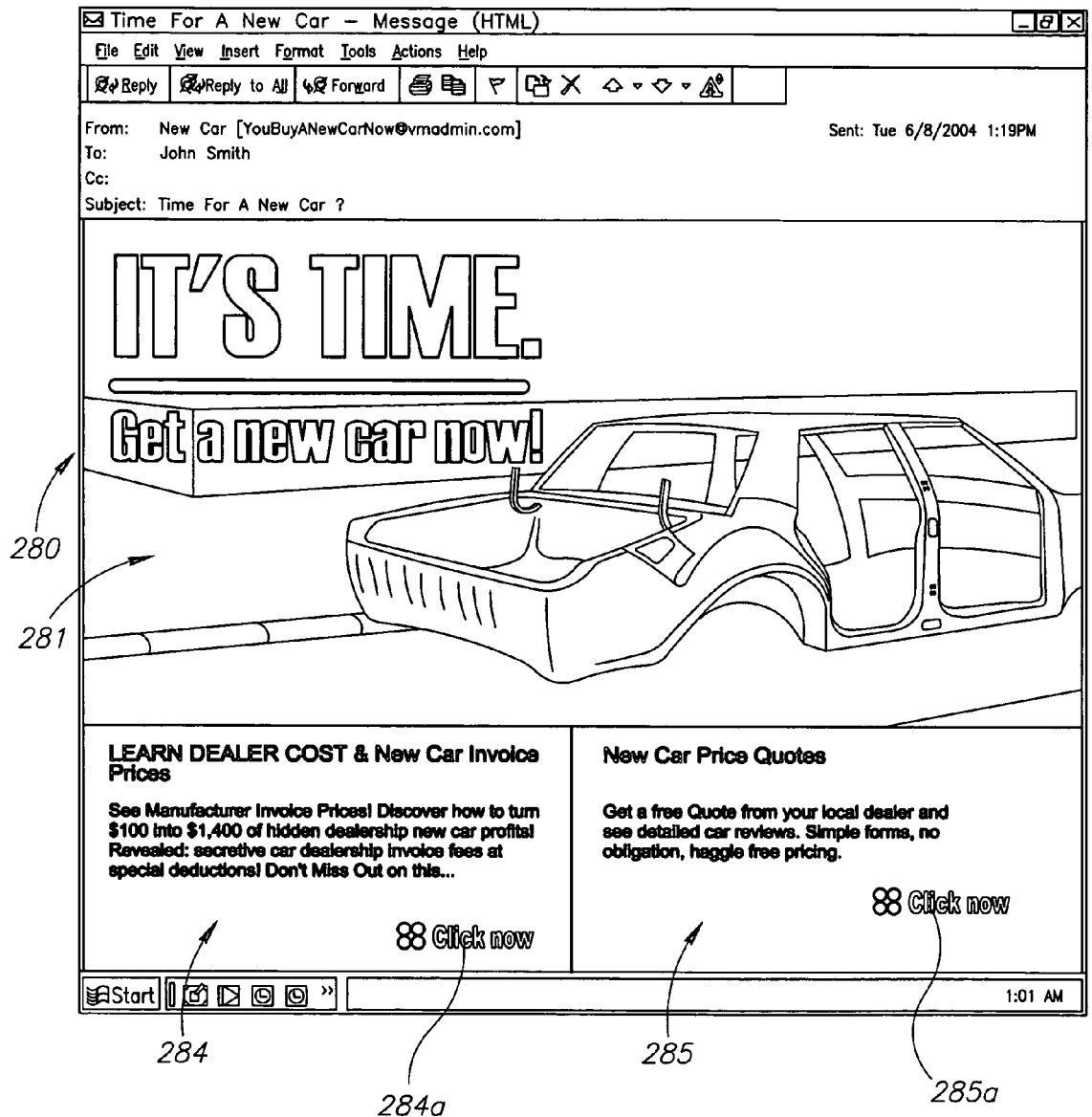
FIGS. 9A and 9B are screen shots of the text of e-mails received in accordance with the present invention.
Figure 9B:
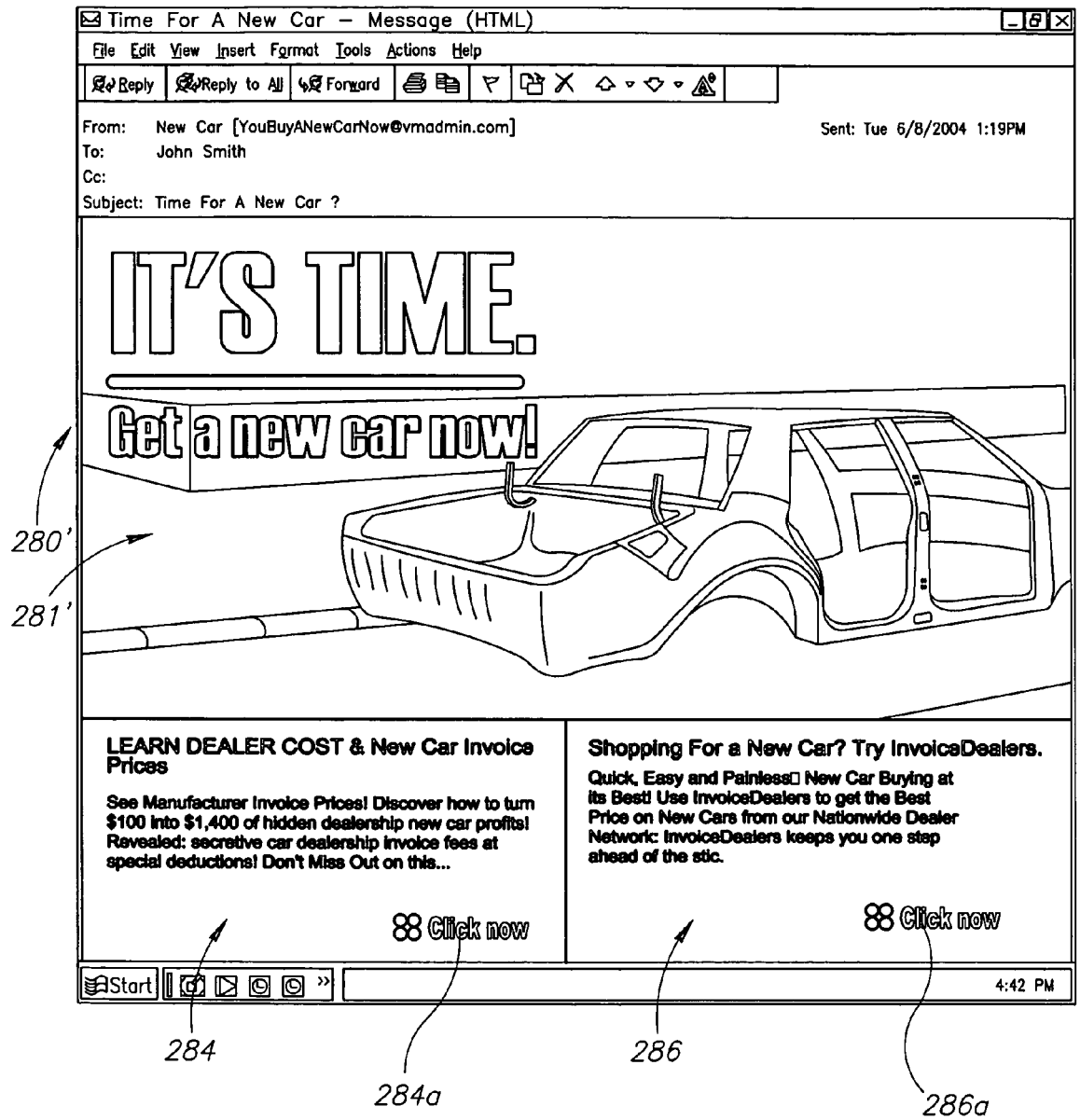

Attention is now directed to FIGS. 9A and 9B, that show screen shots of exemplary e-mails 280, 280', opened at different times (a first time $t_1$ and a second time $t_2$), based on the example template 150 of FIG. 4. The e-mail 280 of FIG. 9A was opened at a fist time ($t_1$), while the e-mail 280' was opened at a second time ($t_2$), subsequent to the first time ($t_1$).

The example e-mails 280, 280' are based on a sent e-mail with two requests (N=2), and therefore, the listing text returned from the requisite content server (CS) 34a-34n and stored in the listing and click caches, typically includes only two listings. In both e-mails 280, 280', the images 281, 281' for the section S1 151 of the template 150, includes an image of an advertisement. The images 281, 281' are static images, of a fixed content formed prior to the e-mail being sent. The images 284, 285 (in e-mail 280) and 284, 286 (in e-mail 280') for sections D1 161 and D2 162 of the template 150, were assembled when the e-mail was opened (in accordance with the processes detailed herein). These images 284, 285, 286, include portions 284a, 285a, 286a that cover links for the user to click on, and are indicated as such, for example, "Click now". (The portions 284a, 285a and 286a are hereafter referred to as links). These underlying links, when activated, typically by a mouse click, ultimately provide the browser of the user 40 with a redirect URL, directing the browser to a target web site (or web page). This web site (or web page) is from the listing that resulted in the image that supported the clicked link.

The links 284a, 285a, 286a include underlying strings. As detailed above, each string typically includes a URL for the Home Server (HS) 30 (www.homeserver.com) and data, typically in a string. The data typically includes a unique identifier, a keyword identifier, a mailing identifier, and position data, with the unique identifier, keyword identifier (KWI) and mailing identifier being used to define a key (as detailed above). An example string, as detailed above, may be as follows:

http:www.homeserver.com/"uniqueidentifier"&" keywordidentifier"&"mailingidentifier"&" positiondata"

Activating the link, for example, by a mouse click, directs the user's browser to the Home Server (HS) 30. From the data in the string, a click cache 43d may be accessed. By accessing the click cache 43d, the browser receives a redirect URL for a web site (or web page) (that is targeted) corresponding to the image from the cached listing, as detailed below.

The resultant e-mail 280 opened at a first time ($t_1$), includes an image 281 of an advertisement, that is static, as the section S1 151 of the template 150 (FIG. 4). The images 284, 285, for sections D1 and D2 of the template 150, that were assembled when the e-mail was opened, include links 284a, 285a. These links 284a, 285a will redirect the user's web browser (browsing application) to the corresponding redirect URLs for the listings that resulted in the images, obtained at this first time ($t_1$).

Similarly, should the e-mail shown by the shaded line 60, be opened at a second time ($t_2$), a time subsequent to the first time ($t_1$), the resultant e-mail 280' would be such that the e-mail client would receive the static image 281' for the section S1 of the template 150 (FIG. 4). The images 284, 286, with links 284a, 286a, for sections D1 and D2 of the template 150, includes one similar image 284 and corresponding link 284a, and one different image 286, and corresponding link 286a, relevant to the time, $t_2$, as the image 285 and its link 285a (FIG. 9A) the first time ($t_1$) has expired. Both images 284, 286 were assembled once the e-mail was reopened at the second time $t_2$.

Figure 10:
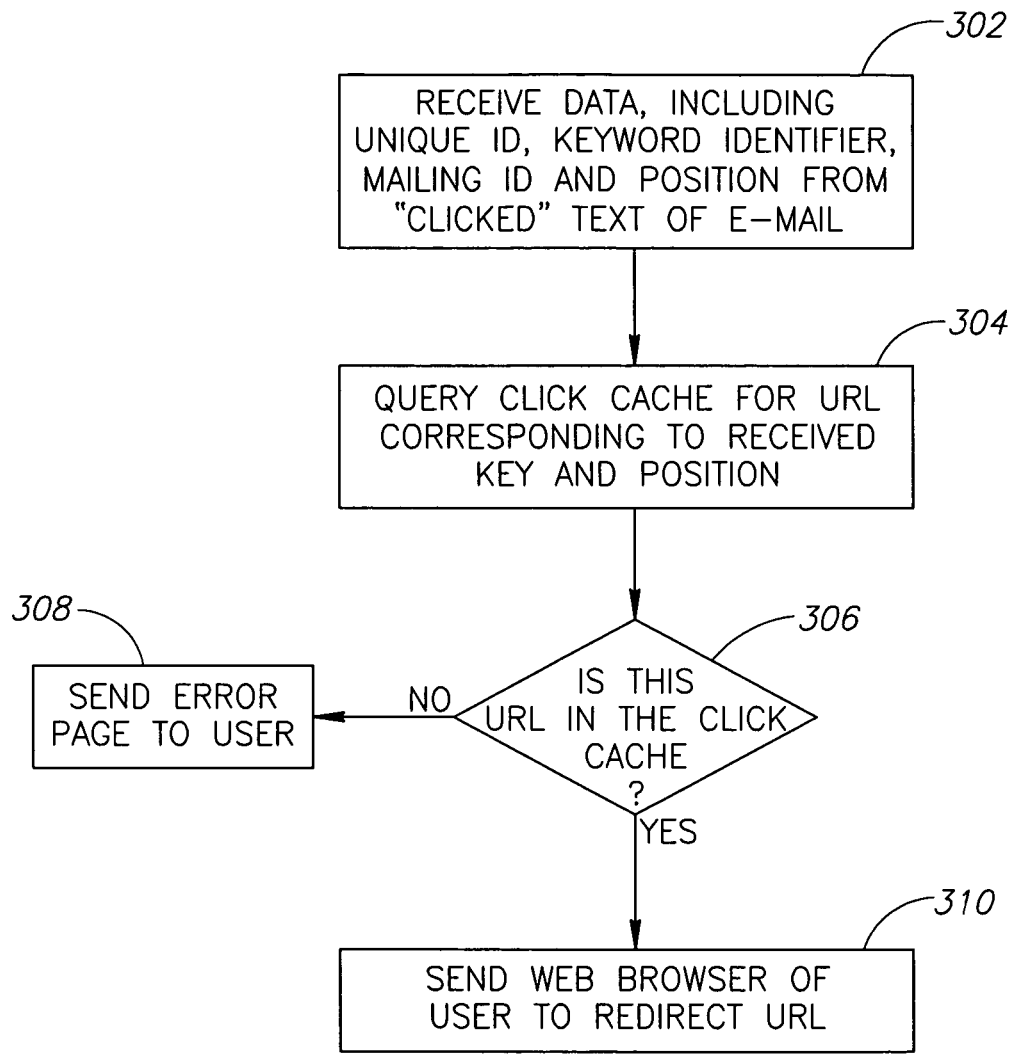
FIG. 10 is a flow diagram of a process for directing an e-mail recipient to an intended web site upon responding to an e-mail in accordance with an embodiment of the invention.

FIG. 10 shows a flow diagram of a process or method in accordance with another embodiment of the invention. This process may be a second phase of the larger process, where the user reaches the web site (or web page) (target web site or target web page) of the provider of the time-relevant text.

Initially, the user, now having received the rendered images in the template for the now-opened e-mail, will "click" on an image 284, 285, 286 or portion thereof, that supports a link, such as the links 284a, 285a, 286a of FIGS. 9A and 9B, to which reference is now also made. Each link, as discussed above, is associated with a string, that includes the URL of the Home Server, and plus a unique identifier, keyword identifier, mailing identifier and position data.

At block 302, the Home Server (HS) 30 receives a unique identifier, keyword identifier (KWI), mailing identifier and position data (for the image location), typically in the above-described string, as a result of links 284a, 285a, 286a of the text 284, 285, 286 being clicked by the user 40 (activating their mouse 51, as shown in FIG. 1, at the desired link 284a, 285a, 286a). The Home Server (HS) 30 then creates a key from the unique identifier, the keyword identifier (KWI), and the mailing identifier, and locates the matching key in the key cache 43a. With the matching key located, the corresponding key in the click cache 43d is located. The click cache 43d is queried for position data matching the position data of the string (of the link), in order to obtain a redirect URL for the particular position data, at block 304. It is then determined if the redirect URL is in the click cache, at block 306.

The redirect URL is a URL for the web site corresponding to the clicked text portion on the rendered e-mail, as programmed into the listed text in the click cache 43d. This URL is typically for a target web site or web page (content) on (or hosted by), for example, a third party server (TPS) 42a-42n.

Figure 11:
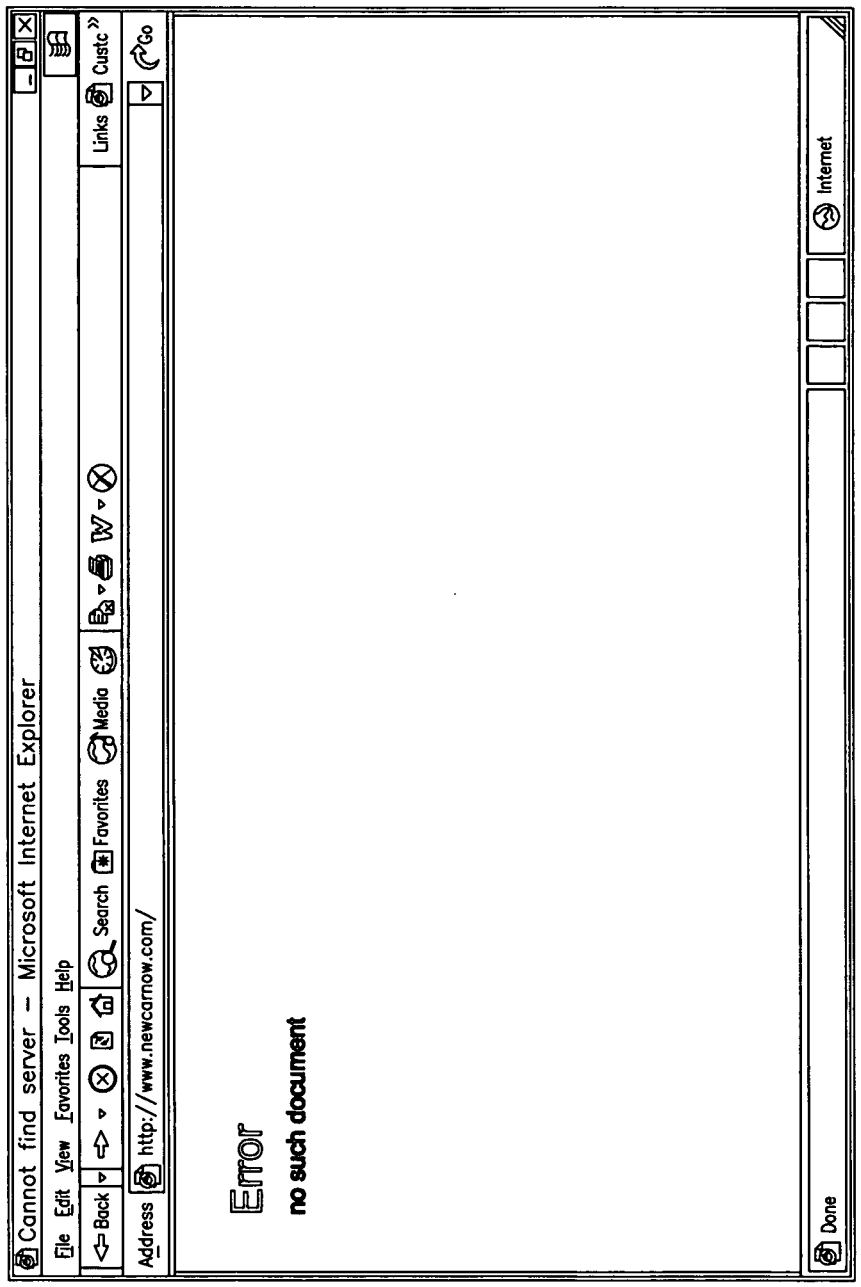
FIG. 11 is a screen shot showing an error or time out.

If the redirect URL is not in the click cache 43d, the user 40 is sent an error page, at block 308. This error page appears on the monitor 48 of the user 40 as, for example, the screen shot shown in FIG. 11.

However, if the redirect URL is in the click cache 43d (with the matching position data), the Home Server (HS) 30 sends the web browser of the user 40 the redirect URL at block 310. The user's web browser receives this redirect URL, and automatically accesses the web page (typically, a target web page) corresponding to the redirect URL.

Figure 12:
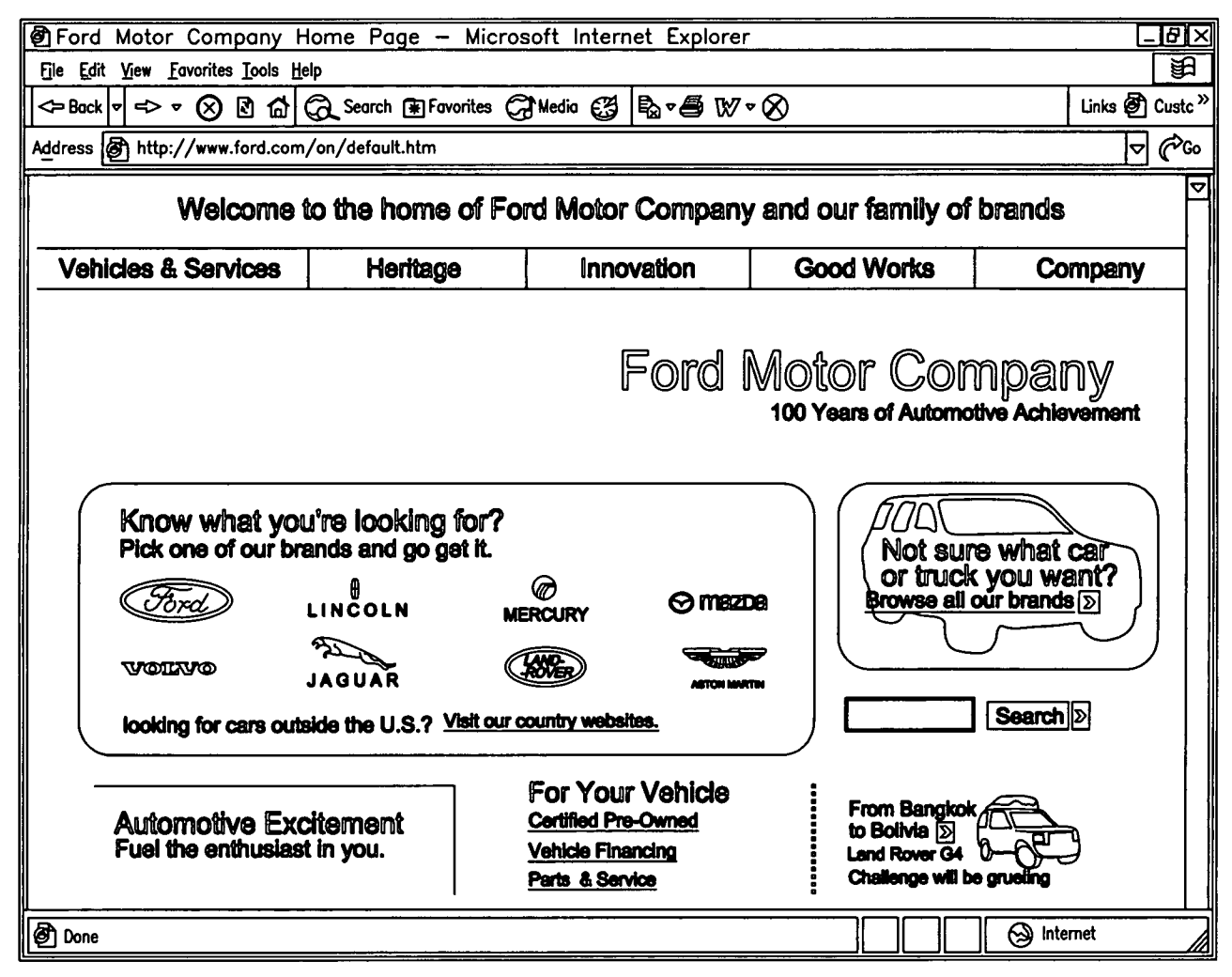

For example, the redirect URL (from KEY 1, position data POS=1 in the example click cache 43d of FIG. 8) may be "www.ford.com." In this case, the user's web browser would be directed to www.ford.com, whereby the web page, obtained at the address www.ford.com, shown in FIG. 12, would appear on the monitor 48 of the user. The server that hosts the site associated with www.ford.com may be any one or more of the third party servers (TPS) 42a-42n.

The click cache 43d is typically designed to expire in a time period that is less than the limit redirect timeouts (described for block 224 above). This time may be, for example, approximately two hours.

Figure 13A:
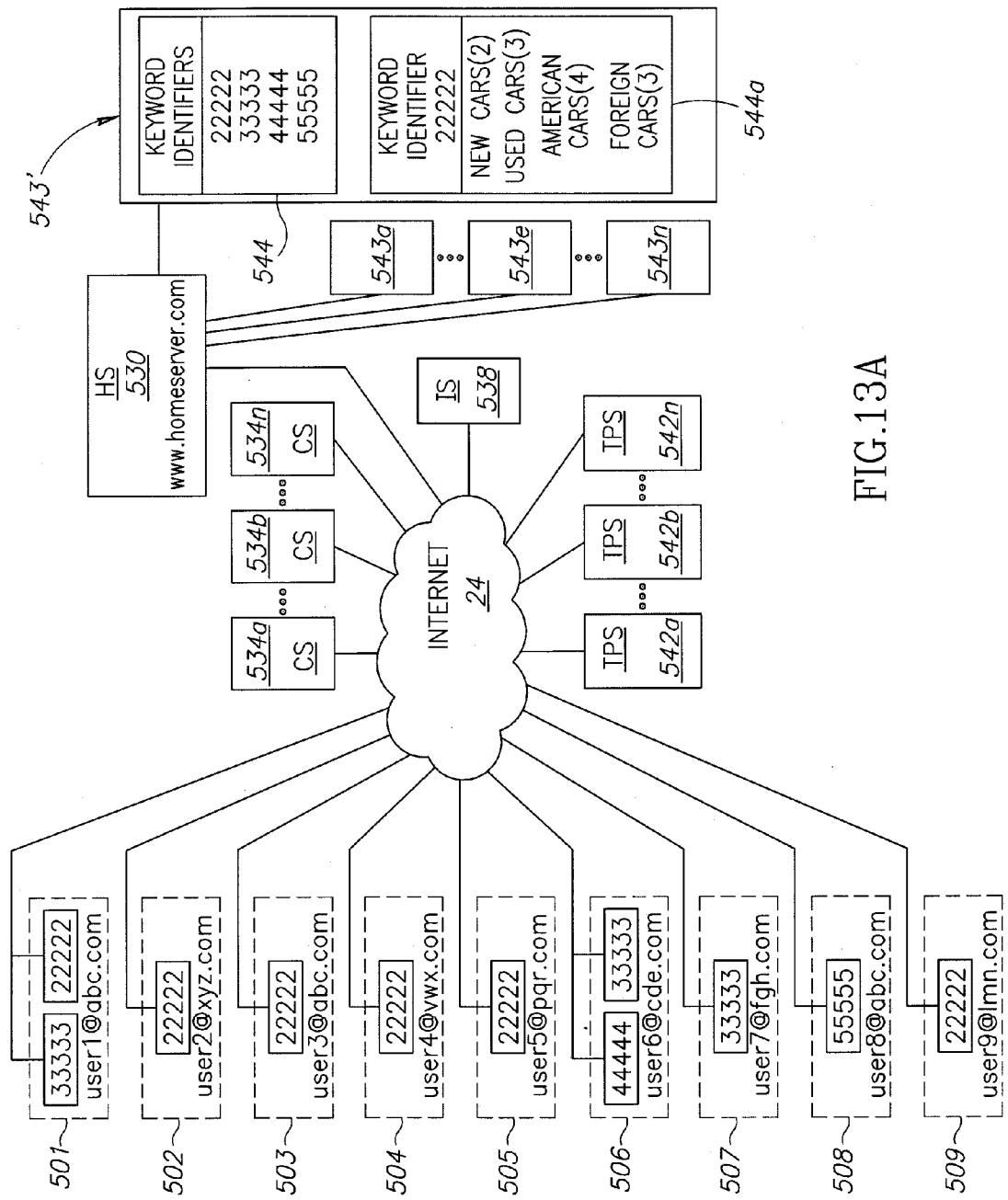
FIGS. 13A-13C are diagrams of content being delivered to a user in accordance with an embodiment of the present invention.
Figure 13B:
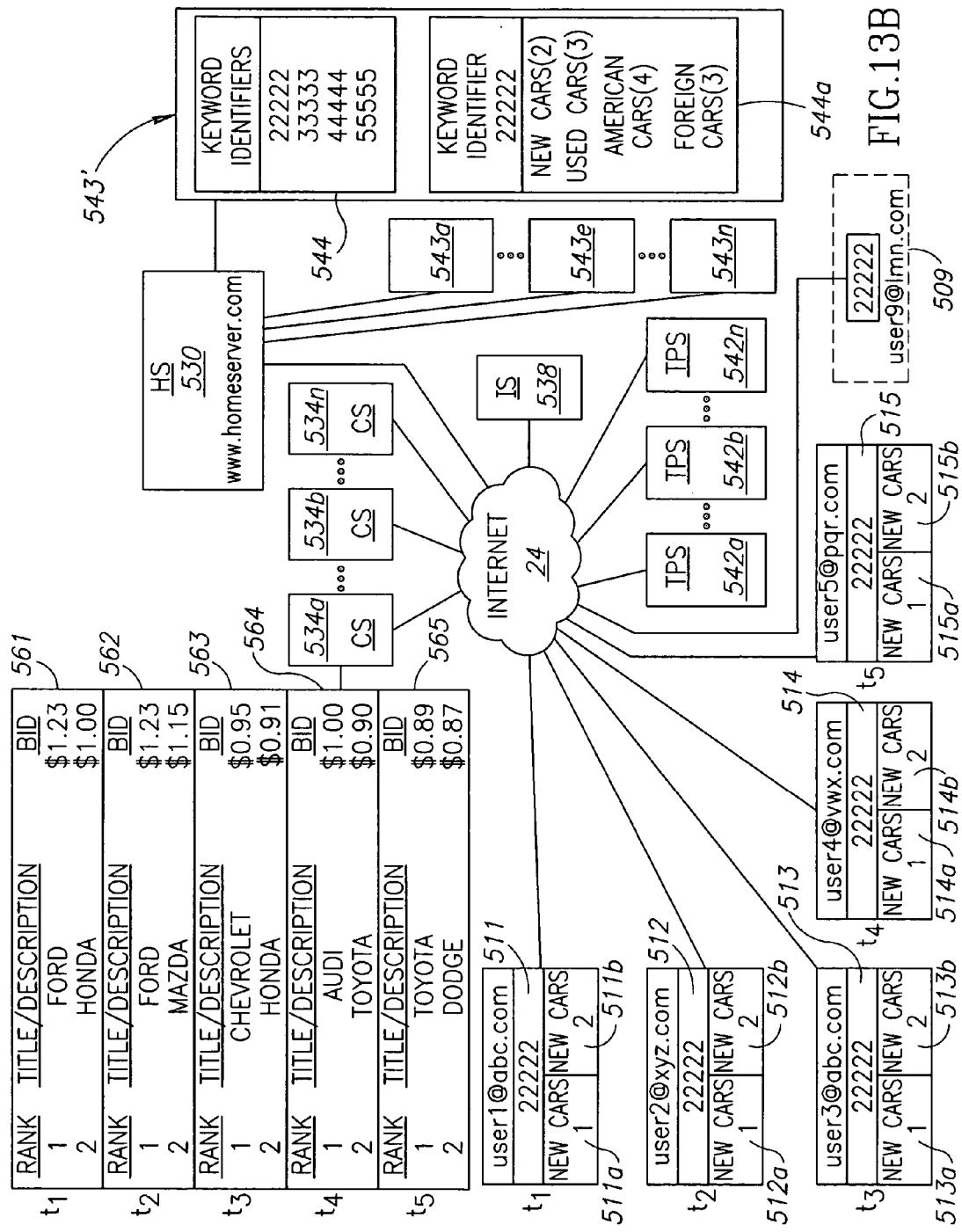
Figure 13C:
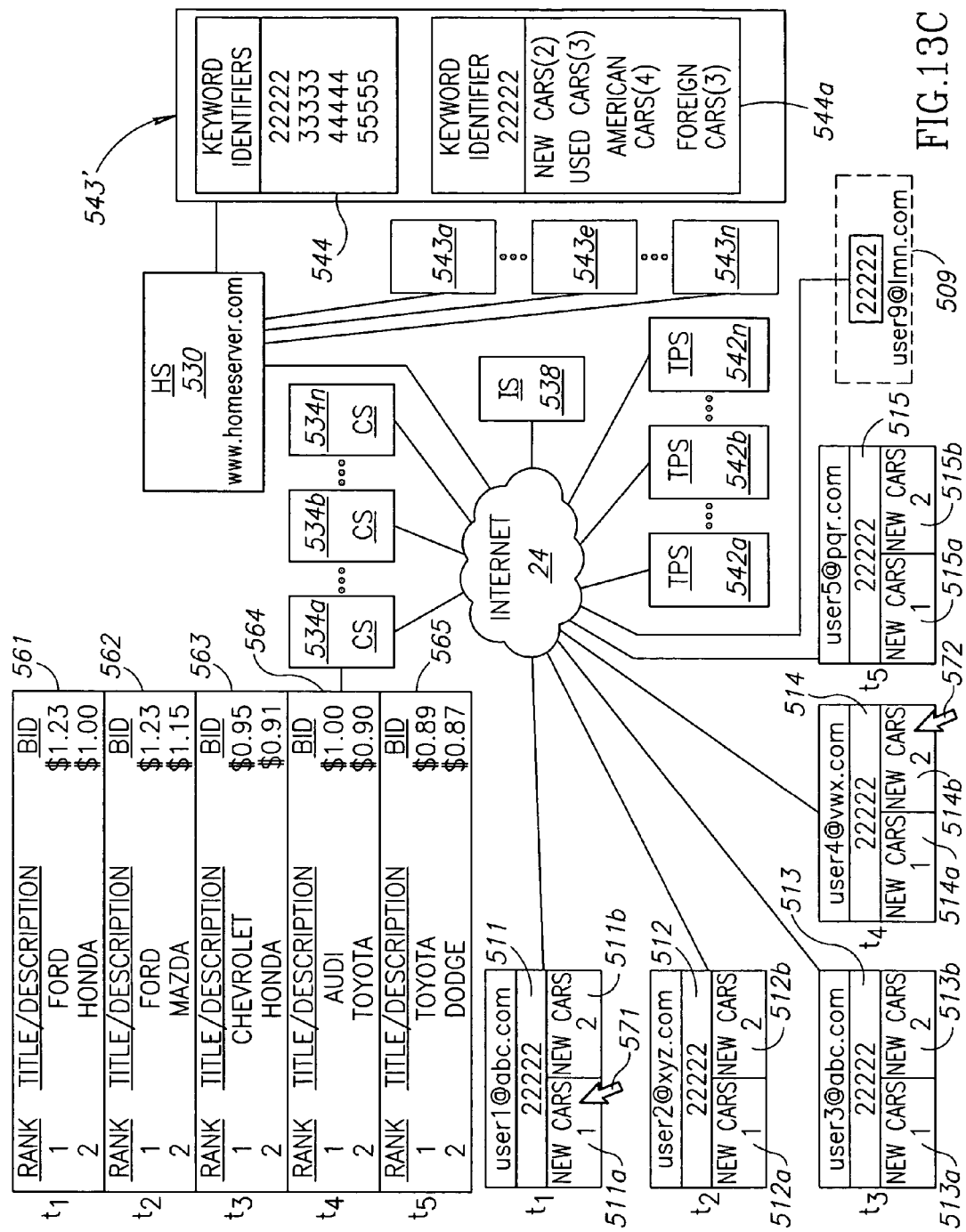

Attention is now directed to FIGS. 13A-13C, that show an example method or process in accordance with an embodiment of the invention. In FIGS. 13A-13C, components from FIG. 1 and described above, have been increased by 500. Components increased by 500 from those of FIG. 1, are similar to their corresponding components of FIG. 1, except where indicated.

In FIG. 13A, nine users, user1 to user9, representative of multiple users along a communications network, such as the Internet 24, have been sent one or more e-mails, represented by the broken line boxes 501-509, from the home server (HS) 530 (similar to the text line 60 shown in FIG. 3). The users (user1 to user9) are typically from different domains, as is common with the Internet 24. For purposes of description, the nine exemplary users, known as user1 to user9, with their corresponding e-mail addresses are: user1@abc.com, user2@xyz.com, user3@pqr.com, user4@vwx.com, user5@pqr.com, user6@cde.com, user7@fgh.com, user8@abc.com, and user9@lmn.com.

Within each e-mail, sent to each of user1 to user9 from the home server (HS) 530, is a keyword identifier (also known as a campaign identifier) for a particular advertising campaign. Each campaign is listed, for example, by a keyword identifier. This keyword identifier is typically a character string, here, for example, represented by numbers in the database 544 of the cache 543' (i.e., 22222, 33333, 44444, 55555 are the keyword identifiers) of the home server (HS) 530. Also, within each e-mail are one or more requests for position data and a corresponding max number, equal to the number of positions in the template, that will be built out in accordance with the e-mail campaign, when the e-mail is opened by the respective user.

For example, the users, user1 to user5, and user9, have all indicated their interest in automobiles, so the home server (HS) 530 has sent them e-mails with the keyword identifier (campaign identifier) 22222, for automobiles. Similarly, for example, other keyword identifiers (campaign identifiers) may be 33333 for home loans, 44444 for fishing, and 55555 for diets. For example, user1 has also received an e-mail for the keyword identifier (campaign identifiers) 33333. User 6 has received two e-mails, one for the keyword identifier (campaign identifier) 33333, and one for the keyword identifier (campaign identifier) 44444. User7 has received one e-mail for the keyword identifier (campaign identifier) 33333, while user8 has received one e-mail for the keyword identifier (campaign identifier) 55555.

Attention is now directed to FIG. 13B, and user1 to user5, and user9, who have received an e-mail for the keyword identifier or campaign identifier 22222. The campaign corresponding to the keyword identifier (campaign identifier) 22222, for example, is for automobiles. For example, user1, user2, user3, user4 and user5, have opened their e-mails for the campaign 22222 at times $t_1$-$t_5$ ($t_1$ being the earliest time and $t_5$ being the latest time), respectively. User9 has not opened his e-mail. The opened e-mails from user1 to user5 has been incremented by "10", and are represented by the respective screen shots 511-515. While the keyword identifier 22222 is described further below, the description below is exemplary for keyword identifiers or campaign identifiers, and is applicable to all other keyword identifiers and campaign identifiers.

The process for handling the opened e-mail by the home server (HS) 530, as well as the process for building out the e-mail templates and ultimately rendering the e-mail with the dynamically generated image over links, and directing the user's browser to a targeted web page or web site, is in accordance with the process detailed above and shown in FIGS. 1-9B. Differences between the aforementioned process and the e-mails being rendered to user 1 to user5, and user9, are noted herein.

Here, for example, the position data is such that the Max Number (N) is 2. In this example, user1, user2, user3, user4 and user5 have clicked their mouse or pointing device on the text line 60 (FIG. 3), opening the e-mail. User9 has not opened the e-mail.

The user's e-mail client sends requests back to the home server (HS) 530, as detailed above for FIGS. 1-9B. The request (from the e-mail client of the user) includes the keyword identifier, for example 22222, a mailing identifier for the particular user, and a Max Number (N), for example, 2. The template is now built out, and the content of the e-mail rendered, in the form of images, in each of the computers associated with user1 to user5. Rendering of the content of the e-mail is such that that there are two positions 511a, 511b, 512a, 512b, 513a, 513b, 514a, 514b, 515a, 515b, for dynamically rendered images that cover links (to targeted web sites or web pages), located in the screen shots 511-515, corresponding to the monitors (and computers) of user1 to user5, respectively.

In the home server (HS) 530, the keyword identifier, here 22222, is matched with the keyword identifier in the database 544 of the cache 543'. With the keyword identifiers matched, the corresponding database 544a, that holds the keywords, is accessed.

The database 544a for the keyword identifier (i.e., 22222), includes keywords, arranged in a priority order, here for example, top to bottom, with the uppermost keyword being the highest priority and lesser priority going downward. For example, in the database 544a, the keyword "NEW CARS" is the highest priority, the keyword "USED CARS" is the second highest priority, the keyword "AMERICAN CARS" is the third highest priority, and the keyword "FOREIGN CARS" is the fourth highest priority. The database 544a typically includes numerous keywords, but these four keywords, are exemplary to illustrate the process. Additionally, the database for a keyword identifier, such as the database 544a, while typically having different keywords, may also include one or more occurrences of one or more of the same keywords. Other orders for the keywords, including random orders, are also permissible.

Additionally, next to each keyword is a number. This number represents the "click cap", the maximum number of times the links in the built-out or received e-mail can be clicked before the keyword will be changed or deactivated, from a previously active status (moved to the next keyword in order). For example, the keyword "NEW CARS" is first in order and has the number "2", for its "click cap" next to it.

All five users (user1-user5) have opened their e-mails from the home server (HS) 530, at different times. User9 has not opened his e-mail. User1 opened his e-mail at a first time $t_1$, user2 opened his email at a second time $t_2$, after $t_1$, user3 opened his e-mail at a third time $t_3$, after time $t_2$, user4 opened his e-mail at a fourth time $t_4$, after time $t_3$, and user5 opened his e-mail at a time $t_5$, after time $t_4$. As all of the requests included the same keyword identifier, i.e., 22222, the keyword "NEW CARS" was pulled from the cache 543' and sent from the home server (HS) 530 to the requisite content server (CS), here, for example, content server (CS) 534a with the Max Number 2, as detailed above. Depending on the time (here, times $t_1$-$t_5$) at which the e-mail was opened, the content server (CS) 534a, utilized the keyword "NEW CARS", the active keyword at the time, to return the corresponding listing texts 561-565 to the requisite user who opened their e-mail at the corresponding time. Images were rendered to the computer of each user (the screen shots 511-515) in accordance with the process described above and shown in FIGS. 1-9B.

Here, for example, user1, who opened his e-mail at time $t_1$, received links to targeted web pages based on listing text 561. User2, who opened his e-mail at time $t_2$, received links to targeted web pages based on listing text 562. User3, who opened his e-mail at time $t_3$, received links to targeted web pages based on listing text 563. User4, who opened his e-mail at time $t_4$, received links to targeted web pages based on listing text 564, while user5, who opened his e-mail at time $t_5$, received links to targeted web pages based on listing text 565.

The listing texts 561-565 include listings that may be ranked. Rankings may be in accordance with Pay Per Click (PPC). Briefly, PPC is such that the party associated with the targeted web site pays the content provider, here, for example, the party who owns the content server (CS) 534a, a certain amount when a user clicks the link provided to him by the content server, that directs the user's browser to the targeted web page. For example, listing text 561, accessed at time $t_1$ by user1 (user1@abc.com) shows FORD® at position 1, the highest ranked position, as the party controlling FORD® will pay the owner of the content server (CS) 534a $1.23 per click. At position 2 is HONDA®, the second ranked position, as the party controlling HONDA® will pay the owner of the content server (CS) 534a $1.00 per click. This is also true for listing texts 562-565, accessed at corresponding times $t_2$-$t_5$, for delivery to the corresponding users, user2-user5, respectively.

The listing texts 561-565 are cached for their respective users, e.g., user1 -user5, with their images and corresponding links placed into the respective templates, resulting in the respective screen shots 511-515, in accordance with the process detailed above and shown in FIGS. 1-9B. For example, for user1, at his screen shot 511, the first position 511a, "NEW CARS 1" ("NEW CARS" being the keyword from which the listing text was obtained, and "1" being the first position from the position data) would support a link to, for example, FORD.com (FIG. 12), the targeted web site for the first ranked listing FORD® in the corresponding listing 561. The targeted web site for FORD®, may be hosted, for example, by a third party server (TPS) 542a.

The second position 511b, "NEW CARS 2" ("NEW CARS" being the keyword from which the listing text was obtained, and "2" being the second position from the position data) would support a link to, for example, HONDA.com, the targeted web site for the second ranked listing HONDA® in the corresponding listing 561. This would also hold the same for user2 to user5 and their corresponding listing texts 562-565. Here also, the listing of rank 1 is at the first position 512a-515a (e.g., NEW CARS 1) in the respective screen shots 512-515, while the listing or rank 2 in each listing text is at the second position 512b-515b (NEW CARS 2) in the respective screen shots 512-515. The targeted web site for HONDA®, may be hosted, for example, by a third party server (TPS) 542b.

The process continues, turning also to FIG. 13C. Here, for example, user1 clicks on position 511a, NEW CARS 1, of his screen shot 511 (of the rendered content of the e-mail). The click is represented by the arrow 571, and is made, for example, at a time $t_6$, subsequent to time $t_5$.

The user's (user1's) browser is directed to the targeted web site for FORD®, for example, www.ford.com (for example, hosted by the third party server (TPS) 542a), in accordance with the process described above for FIGS. 10-12. This "click" is sent back to the home server (HS) 530 and recorded in a second click cache, for example, cache 543e. The cache 543' is queried at the database 544a, to see if the click cap, the number of clicks for this particular keyword, here NEW CARS, has been met. As the click cap for NEW CARS is 2, it has not been met (proximate to time $t_5$), and this data is stored in the home server (HS) 530.

Accordingly, the home server (HS) 530 may continue to send e-mail to users with requests for the keyword identifier 22222, and content will be rendered to the opened e-mail of the users based on the keyword "NEW CARS" (as it is the active keyword). Also, should user9 open his e-mail at this time (between a first click being recorded in the click cache 543e and a second click being recorded therein, as detailed below), his opened e-mail will have its content rendered to it based on the keyword "NEW CARS". However, as detailed immediately below, content will no longer be rendered to opened e-mail in accordance with the keyword "NEW CARS" once a second click is received in the second click cache 543e (as "NEW CARS" would no longer be the active keyword).

Now, for example, user4 clicks on position 514b, NEW CARS 2, of his screen shot 514. The click is represented by the arrow 572, and is made, for example, at a time $t_7$, subsequent to time $t_6$. User4's browser is directed to the targeted web site for TOYOTA®, for example, www.toyota.com, in accordance with the process described above for FIGS. 10-12. This "click" is sent back to the home server (HS) 530 and recorded in a second click cache, for example, cache 543e. The cache 543' is queried at the database 544a, to see if the click cap, the number of clicks for this particular keyword, here NEW CARS, has been met. As the click cap for NEW CARS is 2, it has now been met, and this data is stored in the home server (HS) 530.

With the click cap reached, the home server (HS) 530 ceases to use the keyword "NEW CARS" for the keyword identifier 22222 (as the keyword "NEW CARS" has been deactivated and is no longer the active keyword). As a result, e-mails for the keyword identifier or campaign identifier 22222, opened after this second click is recorded in the second click cache 543e, at a time proximate to time $t_7$, will not receive content based on the first keyword "NEW CARS", but will receive content based on the next highest keyword (the now active keyword) for the keyword identifier. Here, for example, the next highest keyword (for the keyword identifier or campaign identifier 22222) is the second highest (and now active) keyword "USED CARS", and content is provided to the opened e-mails in accordance the keyword "USED CARS." For example, should user9 open his e-mail after time $t_7$, content will be rendered to his opened e-mail based on the keyword "USED CARS."

The keyword "USED CARS" has a click cap of "3". Generation of the requisite screen shots to the respective users for the second keyword USED CARS, is in accordance with the process detailed for the keyword NEW CARS, as detailed above. Similarly, once the second click cache 543e receives three clicks, the click cap is reached and the keyword "USED CARS, is succeeded by the keyword "AMERICAN CARS" and its click cap of "4", as described above, similar to when the keyword "USED CARS", succeeded the keyword "NEW CARS". Similarly, once the second click cache 543e receives four clicks, the click cap is reached and the keyword "AMERICAN CARS", is succeeded by the keyword "FOREIGN CARS" and its click cap of "3", as described above, similar to when the keyword "AMERICAN CARS", succeeded the keyword "USED CARS", and the keyword "USED CARS", succeeded the keyword "NEW CARS". Further processes for the particular keyword identifier or campaign identifier (for example, 22222) continue in accordance with the above-described methodology. The process can continue for as long as there are keywords that have not been exhausted for the corresponding keyword identifier.

Alternately, should the list of keywords be finite, the keywords in their order and with their caps, may be repeated, until terminated by the administrator of the system (the home server (HS) 530). Still alternately, the system (the home server (HS) 530) may be controlled by the system administrator at any time, to change and/or replace keywords and/or caps associated therewith, or the system may be programmed to stop when all keywords and their caps have been exhausted.

The keywords can be changed as often as desired. Typically, the keywords are rotated on an interval basis, such as per day, week, or month. This way, users are exposed to information distribution or advertising campaigns over time, as opposed to a single mass exposure.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for managing keywords over a communications network comprising:
    providing data, by a server system linked to the communications network, in accordance with a first keyword, when the first keyword is active, to electronic communications, that i) have been sent to computers associated with recipients, and ii) have been activated by the recipients such that the data may be responded to, and, each of the computers associated with each of the recipients is linked to the communications network;
    receiving indicators, by the server system, over the communications network, when at least a portion of the data provided to each activated electronic communication, in accordance with the first keyword, has been responded to;
    determining, by the server system, whether the number of received indicators has reached a predetermined number of indicators; and
    when the number of received indicators has reached the predetermined number of indicators, the server system i) deactivating the first keyword, and ii) activating a second keyword for providing data to electronic communications activated while the second keyword is active.

2. The method of claim 1, wherein the first keyword and the second keyword are different.

3. The method of claim 1, wherein the first keyword and the second keyword are the same.

4. The method of claim 1, additionally comprising:
    sending, by the server system, electronic communications to e-mail clients associated with the computers of the recipients, the electronic communications including at least one request, and the at least one request including a keyword identifier, the keyword identifier associated with the first keyword and the second keyword.

5. The method of claim 4, additionally comprising:
    correlating, by the server system, the keyword identifier returned with the at least one request with a keyword identifier in a database associated with the first keyword and the second keyword, and, providing, by the server system, data to the activated electronic communications in accordance with the active first or second keyword associated with the keyword identifier in the database.

6. The method of claim 1, wherein receiving the indicators, by the server system, causes the server system to redirect a browsing application associated with the computer of the recipient associated with each response to the data provided to the activated electronic communication, to be directed to a targeted web site associated with the data provided in accordance with the first or second keyword, while it is the active keyword, to the activated electronic communication.

7. The method of claim 6, wherein each response includes at least one click of a pointing device associated with the computers of the recipients of the electronic communications.

8. The method of claim 1, additionally comprising:
    providing data, by the server system, to electronic communications, in accordance with the second keyword, when the electronic communications are activated while the second keyword is active.

9. The method of claim 1, wherein the data includes content.

10. The method of claim 1, wherein the server system includes at least one server.

11. The method of claim 1, wherein the server system includes a plurality of servers. second keyword is active.

12. A method for managing keywords over a communications network comprising:
    providing data in accordance with an active keyword, by a server system linked to the communications network, to electronic communications associated with computers of recipients, and which have been activated by the recipients of the electronic communications, each computer linked to the communications network;
    receiving indicators, by the server system, when at least a portion of the data provided in accordance with the active keyword, in the activated electronic communications, has been responded to by the recipients;
    determining, by the server system, whether the number of indicators received has reached a predetermined number; and
    when the number of indicators has reached the predetermined number, the server system, deactivating the active keyword and designating a new keyword as the active keyword for providing data to electronic communications.

13. The method of claim 12, wherein the keywords are different.

14. The method of claim 12, wherein the keywords are the same.

15. The method of claim 12, additionally comprising:
    sending, by the server system, electronic communications to e-mail clients associated with the computers of the recipients, each of the electronic communications including at least one request, and the at least one request including a keyword identifier associated with the keywords.

16. The method of claim 15, additionally comprising:
correlating, by the server system, each keyword identifier returned with the at least one request with a keyword identifier in a database associated with the keywords, when each electronic communication has been activated, and the server system providing data to each electronic communication in accordance with the active keyword of the keywords associated with the keyword identifier in the database.

17. The method of claim 12, wherein receiving each indicator causes a browsing application of the computer of the recipient to be redirected to a targeted web site associated with the data provided in accordance with the active keyword, when the electronic communication was activated.

18. The method of claim 17, wherein each of the indicators results from a response defined by the portion of the data in the activated electronic communication having been responded to, the response including at least one click of a pointing device associated with the computer of the recipient of the electronic communication.

19. The method of claim 12, additionally comprising:
providing data, by the server system, to electronic communications in accordance with the new keyword for the electronic communications which are activated while the new keyword is the active keyword.

20. The method of claim 12, wherein the data includes content.

21. The method of claim 12, wherein the predetermined number includes a predetermined number of indicators for the active keyword.

22. The method of claim 12, wherein the server system includes at least one server.

23. The method of claim 12, wherein the server system includes a plurality of servers.

24. A method for managing keywords over a communications network comprising:
providing content, by at least one server linked to the communications network, to activated electronic communications associated with computers of recipients, the computers linked to the communications network, in accordance with a first keyword being the active keyword, from a group of keywords associated with a keyword identifier;
receiving indicators, by the at least one server, that at least a portion of the content provided in accordance with the first keyword, in the activated electronic communications, has been responded to;
determining, by the at least one server, whether the number of indicators received has reached a predetermined number of indicators associated with the first keyword; and
changing, by the at least one server, the active keyword from the first keyword to a second keyword from the group of keywords associated with the keyword identifier, such that the first keyword is deactivated and the second keyword is activated to be the active keyword for providing content to activated electronic communications, when the number of indicators received has reached the predetermined number of indicators.

25. The method of claim 24, additionally comprising:
sending, by the at least one server, electronic communications to e-mail clients associated with the computers of the recipients, the electronic communications each including at least one request including the keyword identifier associated with the group of keywords, the request automatically transmitted from the computers of the recipients to the at least one server when the electronic communications are activated and become the activated electronic communications.

26. The method of claim 25, additionally comprising:
correlating, by the at least one server, the keyword identifier returned with each of the at least one request with the keyword identifier in a database associated with the group of keywords, when each electronic communication has been activated, to become the activated electronic communication, and providing, by the at least one server, content to each activated electronic communication in accordance with the keyword being used from the group of keywords associated with the keyword identifier in the database.

27. The method of claim 26, wherein the indicator includes data corresponding to a click of a pointing device on the at least a portion of the content associated with each activated electronic communication on the computer of each recipient which supports one of the activated electronic communications.

28. The method of claim 26, wherein the content provided to each electronic communication in accordance with the keyword, when the electronic communication is activated, includes data for redirecting a browsing application associated with the computer of the recipient of the electronic communication to a targeted site on the network, the redirecting data activated in response to the click of the pointing device.

29. The method of claim 28, wherein the targeted site includes at least one of a web page or a web site hosted by at least one computer device linked to the communications network and the communications network includes the Internet.

30. The method of claim 26, wherein the at least one server includes a server.

31. The method of claim 26, wherein the at least one server includes a plurality of servers.

32. The method of claim 24, additionally comprising:
providing, by the at least one server, to the activated electronic communications, content in accordance with the second keyword, the activated electronic communications which were activated after the second keyword became the active keyword.

33. A system for managing keywords comprising:
a computer system configured for operating on a communications network, the computer system comprising:
a storage medium for storing computer components; and
a processor for executing the computer components comprising:
a first computer component, configured for providing data to activated electronic communications associated with computers of recipients, in accordance with an active keyword, from a group of keywords, via the communications network;
a second computer component, configured for receiving an indicator via the communications network, from each of the activated electronic communications whose data, has been responded to by the recipients through their computers;
a third computer component, configured for determining if the number of indicators received from responses to the data associated with the active keyword has reached a predetermined number of indicators associated with the active keyword; and
a fourth computer component, configured for changing the active keyword for providing content to electronic communications if the number of indicators received has reached the predetermined number of indicators.

34. The system of claim 33, additionally comprising:
a fifth computer component, configured for sending electronic communications to e-mail clients associated with the computers of the recipients of the electronic communications, each of the electronic communications including at least one request including a keyword identifier, the keyword identifier associated with the group of keywords.

35. The system of claim 33, wherein the second computer component is additionally configured for receiving an indicator that includes data corresponding to a click of a pointing device from the computers of the recipients who have activated the electronic communications.

36. The system of claim 35, wherein the first computer component is additionally configured for providing data for redirecting a browsing application associated with each of the computers of the recipients of the electronic communications and who have activated the electronic communications, to a targeted site on the communications network, the redirecting data activated in response to the click of the pointing device.

37. A method for managing keywords over a communications network comprising:
transmitting, by a server system linked to the communications network, electronic communications, to computers of recipients, the computers linked to the communications network, the electronic communications each including a content request including data for obtaining content for the electronic communication in accordance with an active keyword, such that when the electronic communication is opened, the content request is automatically transmitted from the computer to the server system;
rendering, by the server system, content to the electronic communications, via the communications network, in accordance with the active keyword, for each electronic communication that has been opened by a recipient via their computer;
receiving, by the server system, an indicator from each open electronic communication, when at least a portion of the content provided to the opened electronic communication, in accordance with the active keyword, has been responded to; and,
when the number of indicators received has reached a predetermined number, the server system changing the keyword that is the active keyword to another keyword, that becomes the active keyword, for providing content to electronic communications.

38. The method of claim 37, wherein the rendering the content to the opened electronic communication, by the server system, is performed automatically.

39. The method of claim 37, wherein the predetermined number includes a predetermined number of indicators for the active keyword.

40. The method of claim 37, wherein the server system, after changing the keyword that is the active keyword, provides content to the electronic communications which are opened while the changed keyword is the active keyword.

41. The method of claim 40, wherein the active keyword and the changed keyword to being the active are different.

42. The method of claim 40, wherein the keywords are the same.

43. The method of claim 40, wherein the server system includes at least one server.

44. The method of claim 40, wherein the server system includes a plurality of servers.

45. A method for providing content over a communications network comprising:
electronically maintaining, in a storage device linked to the communications network, at least one identifier associated with a plurality of keywords, each of the keywords for providing content to opened electronic communications, when said each keyword is the active keyword;
receiving a content request, by at least one processor in a device linked to the communications network, the processor in electronic communication with the storage device, the content request activated when a user opens an electronic communication sent to a terminal associated with the user and the terminal is linked to the communications network, and the content request is automatically transmitted from the terminal associated with the user who opened the electronic communication to the at least one processor over the communications network, the content request embedded in the electronic communication, the content request including the at least one identifier corresponding to a plurality of keywords, that upon receipt causes content to be obtained for the active keyword associated with the at least one identifier, and providing the content to the opened electronic communication; and
changing the active keyword, by the at least one processor linked to the communications network, the processor linked to the storage device, when a predetermined number of responses to the content corresponding to the active keyword associated with the at least one identifier have been received over the communications network from the terminal associated with the user who has opened the electronic communication, the changed active keyword for providing content to the electronic communication opened while the changed active keyword is the active keyword.

46. The method of claim 45, additionally comprising:
providing, by the at least one processor, content in accordance with the changed active keyword in response to receiving a content request for the at least one identifier to electronic communications opened when the changed active keyword is the active keyword.

47. The method of claim 46, wherein the at least one processor includes the same processor.

48. The method of claim 46, wherein the at least one processor includes a plurality of different processors.

49. A method for managing keywords and providing content over a communications network comprising:
providing, by a server system, content to electronic communications received on computers of recipients of the electronic communications, the computers linked to the communications network, when the electronic communications are opened, over the communications network, in accordance with an active keyword;
receiving, by the server system, an indicator for each opened electronic communication which has received content in accordance with the active keyword, when at least a portion of the content has been responded to; and
when the number of indicators received has reached a predetermined number of indicators, deactivating, by the server system, the keyword that is the active keyword, and activating another keyword, that becomes the active keyword, used for providing content to electronic communications opened after the number of indicators received has reached the predetermined number of indicators.

50. The method of claim 49, additionally comprising:
providing, by the server system, content in accordance with another keyword that became the active keyword, to the electronic communications opened while the another keyword is the active keyword.

51. The method of claim 50, wherein the server system includes at least one server.

52. The method of claim 50, wherein the server system includes a plurality of servers.

53. The method of claim 50, wherein the active keywords are the same keywords.

54. The method of claim 50, wherein the active keywords are different keywords.

* * * * *